(12) United States Patent
Morrison

(10) Patent No.: US 7,109,863 B2
(45) Date of Patent: Sep. 19, 2006

(54) RF COMMUNICATIONS APPARATUS AND MANUFACTURING METHOD THEREFOR

(75) Inventor: Christopher S. Morrison, Scottsdale, AZ (US)

(73) Assignee: Nuvo Holdings, LLC, Scottsdale, AZ (US)

(*) Notice: Subject to any disclaimer, the term of this patent is extended or adjusted under 35 U.S.C. 154(b) by 0 days.

(21) Appl. No.: 10/906,806

(22) Filed: Mar. 8, 2005

(65) Prior Publication Data

US 2005/0195082 A1   Sep. 8, 2005

Related U.S. Application Data

(63) Continuation-in-part of application No. 10/795,720, filed on Mar. 8, 2004.

(60) Provisional application No. 60/650,307, filed on Feb. 3, 2005, provisional application No. 60/551,191, filed on Mar. 8, 2004.

(51) Int. Cl.
*G08B 13/14* (2006.01)

(52) U.S. Cl. .................. 340/568.1; 340/429; 343/741

(58) Field of Classification Search ............ 340/568.1, 340/572.1–572.8, 429, 440; 343/741, 895
See application file for complete search history.

(56) References Cited

U.S. PATENT DOCUMENTS

| | | |
|---|---|---|
| 3,170,597 A | 2/1965 | Reichenberger |
| 4,647,937 A | 3/1987 | Hidaka et al. |
| 5,072,233 A | 12/1991 | Zanzig |
| 5,422,650 A | 6/1995 | Hill |
| 5,469,178 A | 11/1995 | Nguyen et al. |
| 5,469,180 A | 11/1995 | Wiggenhorn |
| 5,886,647 A | 3/1999 | Badger et al. |
| 5,973,650 A | 10/1999 | Nakanishi |
| 5,995,054 A | 11/1999 | Massey |
| 6,027,027 A | 2/2000 | Smithgall |
| 6,036,055 A | 3/2000 | Mogadam et al. |
| 6,067,052 A | 5/2000 | Rawles et al. |
| 6,104,354 A | 8/2000 | Hill et al. |
| 6,480,110 B1 * | 11/2002 | Lee et al. ............. 340/572.5 |
| 6,504,481 B1 | 1/2003 | Teller |
| 6,518,877 B1 | 2/2003 | Starkey et al. |
| 6,522,308 B1 * | 2/2003 | Mathieu .................. 343/895 |
| 6,567,050 B1 * | 5/2003 | Briggs ..................... 343/741 |
| 6,970,141 B1 * | 11/2005 | Copeland et al. ........ 343/866 |
| 2003/0055589 A1 | 3/2003 | Mogadam |

OTHER PUBLICATIONS

Loewen "Microchip:Designing Loop Antennas for the rfPIC12F675", 2003 Microchip Technology Inc.
"Microchip: 8-Bit CMOS Microcontroller with UHF ASK/FSK Transmitter" 2001 Microchip Technology Inc., pp. 1, 11, 33-42.

* cited by examiner

*Primary Examiner*—Phung T. Nguyen
(74) *Attorney, Agent, or Firm*—Meschkow & Gresham, P.L.C.

(57) ABSTRACT

Described herein are a transient event detector (35) comprising electrical circuitry (50) suitable to detect a transient event, and a container (34) having a wall with at least two electrically conductive contacts (23, 44) electrically connected to the electrical circuitry (50), each of the at least two electrically conductive contacts (23, 44) being electrically isolated from each other, and a movable electrically conductive piece (36) that intermittently connects at least two of the at least two electrically conductive contacts when the electrically conductive piece (36) is in motion. An RF circuit (54) couples to a loop antenna (25) having a tuning capacitor (26) formed as conductive pads (26', 26") juxtaposed on opposing sides of a planar dielectric substrate (92). The tuning capacitor (26) has a hole (27) through it, and the hole has a size that is selected to cause the loop antenna (25) to exhibit a desired resonance frequency.

32 Claims, 15 Drawing Sheets

RF COMMUNICATIONS APPARATUS AND MANUFACTURING METHOD THEREFOR

RELATED INVENTION

The present invention claims benefit under 35 U.S.C. 119(e) to "Inventory Systems and Methods," U.S. Provisional Patent Application Ser. No. 60/551,191, filed 8 Mar. 2004, and to "Inventory Systems and Methods," U.S. Provisional Patent Application Ser. No. 60/650,307, filed 3 Feb. 2005, both of which are incorporated by reference herein.

The present invention is a continuation-in-part of "Asset Tag with Event Detection Capabilities," Ser. No. 10/795,720, filed 8 Mar. 2004, by at least one inventor in common herewith, which is incorporated by reference herein.

TECHNICAL FIELD OF THE INVENTION

The present invention relates generally to radio-frequency (RF) apparatuses which use loop antennas and which use tuning capacitors to tune the loop antennas. In addition, the present invention relates to such RF apparatuses which are configured to operate as asset monitoring tags.

BACKGROUND OF THE INVENTION

The identification, measurement and/or control of physical assets are important aspects of modern business practices. Frequently, assets are misidentified, misplaced or incorrectly dispensed, thereby leading to incorrect inventory and/or receivables.

A common modern method for dealing with asset control is the use of bar codes. These bar codes can be used to both identify a product and support the determination of the time and location of dispensation.

Another increasingly common method for asset control is the use of radio frequency tags (RF tags). These are tags that are attached to assets and that include at least a radio transmitter and identification circuit. The identification circuit continually, periodically, or after an interrogatory is sent from a receiver, sends the identification of the product.

These systems, while excellent for product identification, are not optimized for tracking events that may occur to the products. These events may be movement of the asset, tilting of the asset, acceleration of the asset, changes in temperature of the asset, breakage of the asset (or associated tag), button presses, and the like.

Therefore, there is a present and continuing need for improved asset tags used for the identification, measurement and/or control of physical assets.

Asset tags desirably communicate data describing the events they track to other devices for processing that data. In many situations, it is convenient to use radio-frequency (RF) transmissions to communicate the data. But conventional RF communication techniques fail to address the needs of systems that rely upon asset tags, and conventional RF communication techniques are not well suited to other types of RF communications apparatuses as well.

Most electronic systems benefit from lower cost components. But systems that use asset tags as well as other types of electronic systems have a particularly heightened need for low cost components. The need for a low cost component is heightened when a particular device, such as an asset tag, is used in large numbers by a given system. In this situation, any unnecessary costs are multiplied by the number of the often-used device in the system.

And, many electronic systems, including those that include asset tags, benefit from components of smaller size. When asset tags are associated with products, the asset tags need to be as small as possible so that they do not detract from the packaging and ambiance, so that they do not take up significant space that is better used by the products with which they are associated, and so that they do not interfere with the operation and manipulation of the products, their packaging, or their containers.

Likewise, most electronic systems can benefit from operation with the lowest possible power consumption. But systems that rely upon asset tags and other types of electronic systems have a heightened need for low-power operation. When a device, such as an asset tag, relies upon the use of one or more batteries to provide its electrical power, the selected battery often drives many design parameters for the device.

Greater battery capacity can lessen the pressures for achieving low-power operation. Greater battery capacity can be achieved by using more expensive batteries of a given size, larger batteries of a given battery technology, by using a greater number of batteries, by using rechargeable batteries, and/or by requiring occasional replacement of batteries. But each of these options is undesirable. A more expensive battery, a larger battery, or a larger number of batteries poses a cost problem. Accordingly, these are undesirable solutions when a heightened need exists for low cost. And, larger batteries or a greater number of batteries cause a battery-powered device, such as an asset tag, to be larger than it might be. Again, these are undesirable solutions when a need exists for making an RF apparatus as small as possible.

Rechargeable batteries are also undesirable to the extent that they are more expensive than non-rechargeable batteries. And, expenses and size requirements are further increased by an undesirable need to recharge the batteries and to provide the associated recharging circuits and related paraphernalia.

The use of replaceable batteries is also undesirable in some applications because the ongoing need to purchase replacement batteries increases costs in many electronic applications, such as those that rely upon asset tags. But replaceable batteries and/or rechargeable batteries are undesirable in asset tag and other electronic applications for other reasons as well. RF apparatuses that use rechargeable and/or replaceable batteries will be required to operate on low battery reserves from time to time. This will result in an unreliable operation. And, when the battery reserves are finally exhausted, they impose a nuisance factor on the user who is denied the services that RF apparatus should be providing and is then required to either recharge or replace batteries. In electronic systems that may use several battery-powered devices, such as systems that rely upon asset tags, this nuisance factor is a serious problem.

Accordingly, asset tags and many other electronic devices can benefit from a capability to engage in RF communications, to be as small as possible, to be as inexpensive as possible, and to be powered by one or more batteries that are as small and inexpensive as possible, yet are non-replaceable if at all possible.

Engaging in RF communications on tight cost, power, and space budgets is an extremely challenging task. One of the factors that exerts a substantial influence on this task is the antenna through which RF communications takes place. A loop antenna is a conductive loop which is tuned using a tuning capacitor coupled to the loop to resonate at a desired RF frequency. Conventional loop antennas exhibit many desirable characteristics for these types of applications. For example, they can be formed in a small space. And, they can be configured to exhibit a high quality factor (Q), which allows them to operate at a somewhat greater power efficiency for a given loop size.

But conventional loop antennas fail to achieve the space and efficiency goals that would be beneficial for asset tags or other RF communications devices. One reason for this failure is that as loop antennas get smaller to meet tight space requirements, they then need to be operated at as high a Q as possible to maximize their power efficiency. This makes a loop antenna highly sensitive to tuning. In other words, if the tuning capacitor exhibits a capacitance as little as a couple of percent off of the ideal value which achieves resonance at a desired RF frequency, power efficiency can suffer tremendously. But, RF devices on tight power budgets cannot afford reduced power efficiency.

The sensitivity to tuning of conventional high Q antennas poses another problem. Governmental regulatory agencies, such as the Federal Communications Commission (FCC) in the United States and counterparts in other countries, restrict the amount of power that can be broadcast from an antenna. Manufacturers are required to reduce power output based on a worst likely case manufacturing sample. The sensitivity to tuning of a high Q antenna means that when the antenna cannot be consistently tuned, transmit power will need to be reduced to meet regulations, and the radio range will be reduced from what it might be if antennas could be more consistently tuned. And, the regulations tend to be more strict for high volume, mass market transmission applications. These are the same applications where cost concerns are strongly felt.

Conventional loop antennas in these situations use discrete, manually-tuned, board-mounted tuning capacitors, discrete, high precision, board-mounted tuning capacitors, discrete, highly stable, board-mounted tuning capacitors, and/or discrete, pre-screened, board-mounted tuning capacitors. Discrete board-mounted capacitors are leaded or surface-mount capacitors that are mounted on a printed wiring board. But, manually-tuned and pre-screened tuning capacitors are simply not compatible with mass-market manufacturing techniques where large numbers of devices need to be manufactured on a tight cost budget. And, high precision and/or highly stable capacitors are so expensive that they also are undesirable in applications on a tight cost budget. In such situations, conventional loop antennas couple resistive elements to the loop antenna to reduce the Q to the point where a tuning capacitor that meets budgetary requirements can effectively tune the antenna. But in a battery powered device on a tight power budget, techniques that lead to such power inefficiencies are undesirable.

SUMMARY OF THE INVENTION

It is an advantage of the present invention that an improved RF communications apparatus and manufacturing method are provided.

Another advantage is that an apparatus and method are provided that are compatible with a small, low cost, RF communications apparatus.

Another advantage is that an apparatus and method are provided that are compatible with low cost, low power RF communications.

Another advantage is that an apparatus and method are provided that are compatible with maximizing RF radio range at low cost and while meeting regulatory requirements.

Another advantage is that an RF communications apparatus and method are provided that are compatible with the use of a non-replaceable battery.

At least a portion of these and/or other advantages are realized in one form by a radio-frequency (RF) communications apparatus that includes a planar dielectric substrate. An RF circuit is mounted on the planar dielectric substrate. A conductive loop is formed as a first conductive trace on the planar dielectric substrate. The conductive loop has a feed point coupled to the RF circuit by a second conductive trace on the planar dielectric substrate. A tuning capacitor is formed as first and second juxtaposed conductive pads located on opposing sides of the planar dielectric substrate. The first conductive pad is in contact with a first portion of the conductive loop and the second conductive pad is in contact with a second portion of the conductive loop. The tuning capacitor and the conductive loop together form a loop antenna. The tuning capacitor has a hole that exhibits size selected to tune the loop antenna.

At least a portion of the above and/or other advantages are realized in another form by a method of manufacturing a radio-frequency (RF) communications apparatus. The method calls for forming conductive patterns on a printed wiring board to include a loop antenna having a tuning capacitor with first and second conductive pads juxtaposed on opposing sides of the printed wiring board and a conductive loop having first and second portions respectively contacting the first and second conductive pads. Capacitance of a feature on the printed wiring board is measured, where the feature exhibits a capacitance proportional to the capacitance of the tuning capacitor. A hole size is then selected in response to this measured capacitance. A hole is then formed through the tuning capacitor. The hole exhibits the hole diameter.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE PREFERRED EMBODIMENTS

Figure 1:
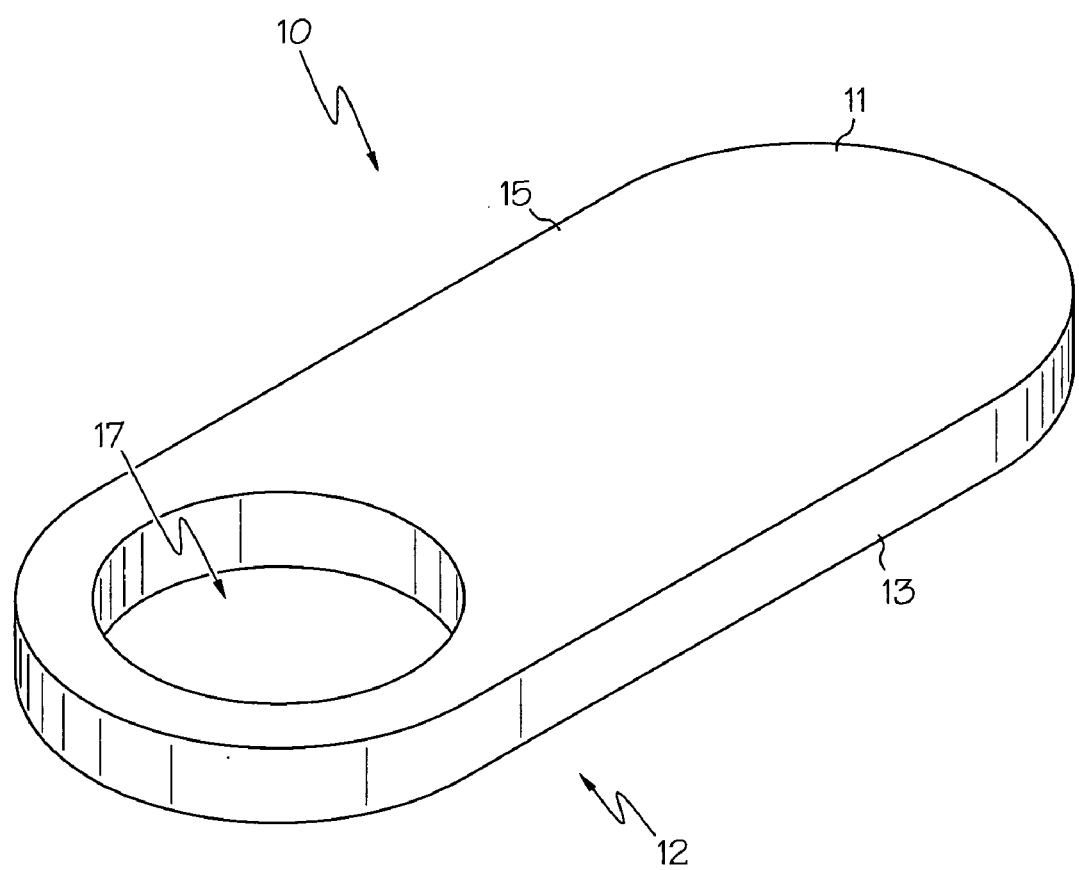
FIG. 1 is a perspective view of a first preferred embodiment of an RF apparatus configured according to the present invention.

FIG. 1 is a perspective view of a first preferred embodiment of a radio-frequency (RF) apparatus or device 10 configured according to the present invention. Device 10 is useful for measuring events that occur to assets. More specifically device 10 is useful for measuring events such as motion, tipping, acceleration, temperature changes, breakage, button presses or the like using a transient event detector. And, device 10 is configured as an asset tag device 10 that is removably or permanently associatable with an asset. Device 10 functions to track physical properties of the associated asset such as location, motion, tilting, changes in temperature, breakage, or the like. But the present invention is not limited only to an asset tag configuration, and can be used in a wide variety of diverse RF apparatuses.

Device 10 according to this first embodiment is formed as a composite body 15 that contains at the least one event detection and reporting circuitry 50 (FIG. 2) that further comprises at least one event detection structure 35 (FIG. 5) and an RF circuit 54, such as a radio transmitter. In one preferred embodiment, device 10, according to the present invention, further includes at least one attachment structure 17. In this preferred embodiment, the attachment structure is an aperture or opening in the body 15 that is suitably sized to receive a projecting or elongate portion of the asset, such as a neck of a bottle or the like. Other structures that are capable of being received by the aperture 17, such as a suitably sized spheres and the like, are considered to fall within the scope of the present invention. Additionally, other attachment structures, both chemical or mechanical, that function to associate the body 15 to an asset may be used and are also considered to fall within the scope of the present invention.

In the preferred embodiment, the body 15 specifically comprises a top section 11, a bottom section 12, and an intermediate section 13 that is sandwiched between the top and bottom sections, 11 and 12, and contains at least one cavity 14 (FIGS. 4–5) that further contains event detecting and reporting circuitry 50. Preferably, event detecting and reporting circuitry 50 is securely either built directly into the cavity 14 or built separately and then attached to an interior surface of the cavity 14 to prevent unwanted movement or breakage of the circuitry 50.

Figure 2:
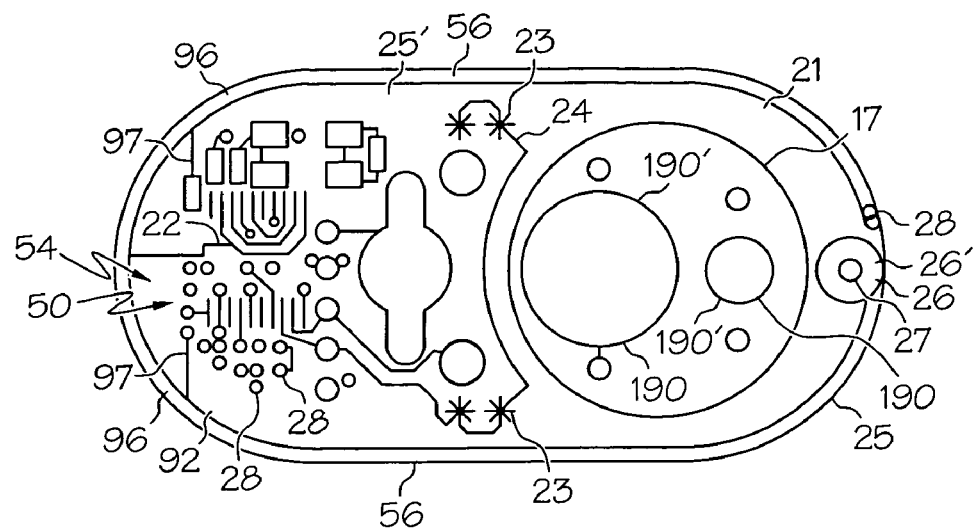
FIG. 2 is a top view of a bottom printed wiring board (PWB) from the RF apparatus of FIG. 1, illustrating a preferred electrical circuit trace for the top side of the bottom board.
Figure 3:
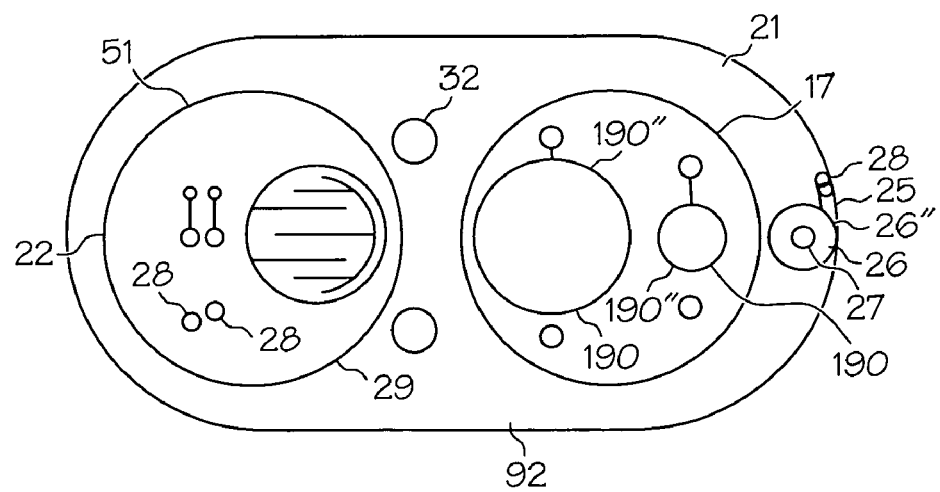
FIG. 3 is a bottom view of the bottom PWB from the RF apparatus of FIG. 1, illustrating a preferred circuit trace for the bottom side of the bottom PWB.
Figure 4:
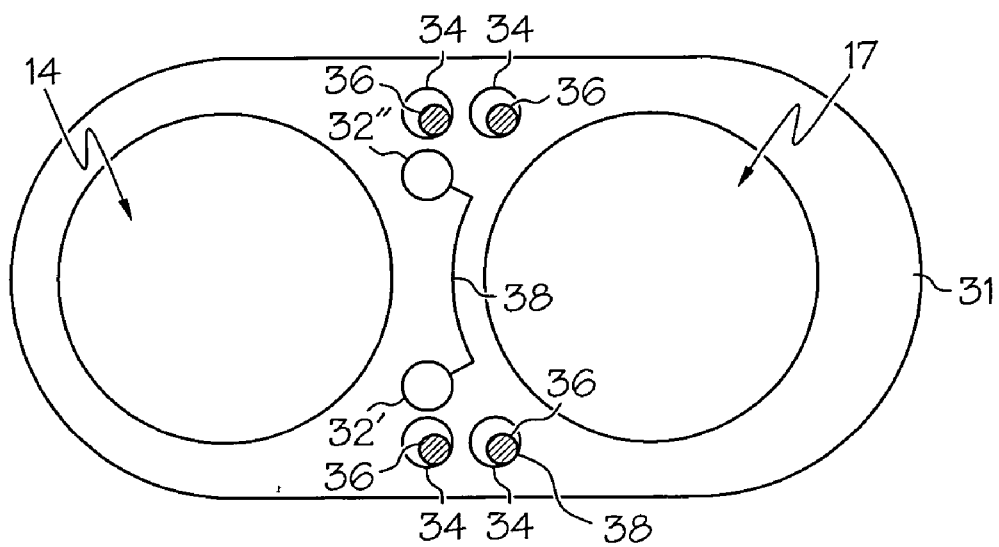
FIG. 4 is a top view of a middle PWB from the RF apparatus of FIG. 1, illustrating a preferred electrical circuit trace for the top side of the middle PWB.
Figure 5:
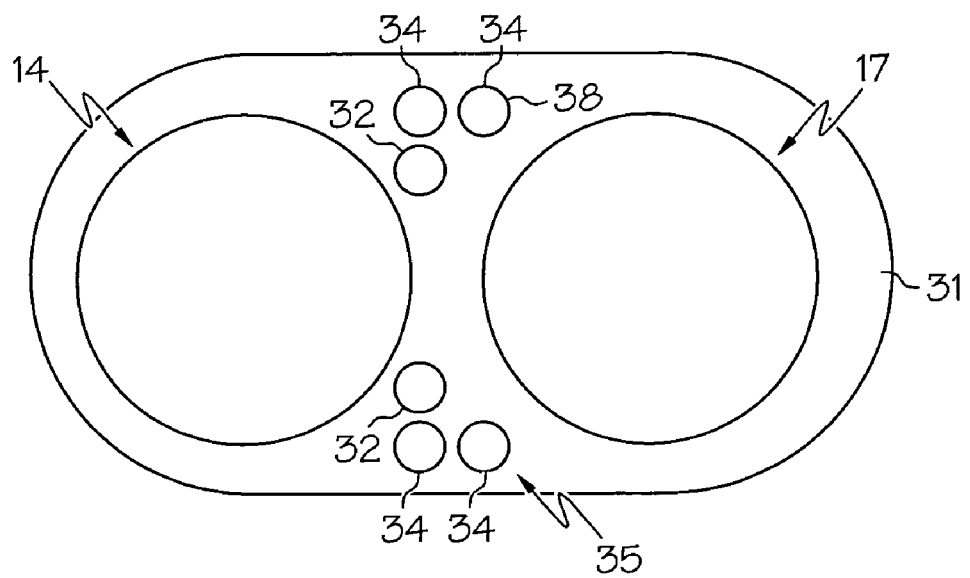
FIG. 5 is a bottom view of the middle PWB from the RF apparatus of FIG. 1, illustrating a preferred electrical circuit trace for the bottom side of the middle PWB.
Figure 6:
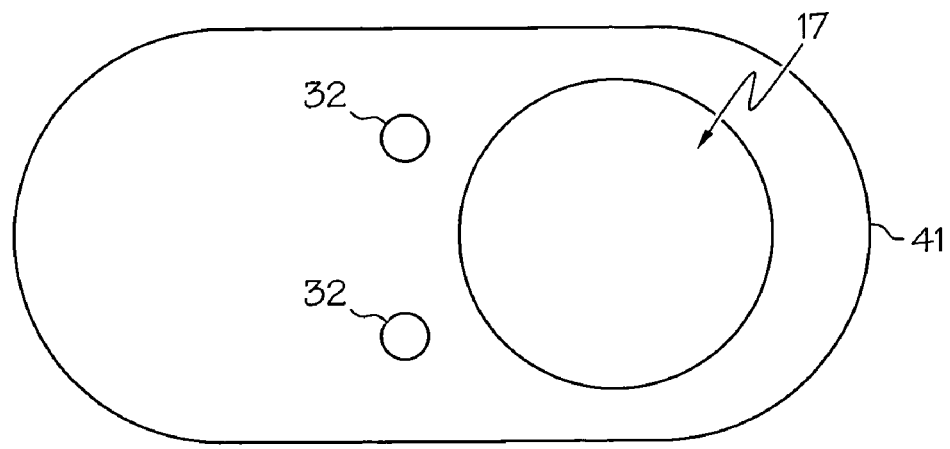
FIG. 6 is a top view of a top PWB from the RF apparatus of FIG. 1, illustrating a preferred circuit trace for the top side of the top PWB.
Figure 7:
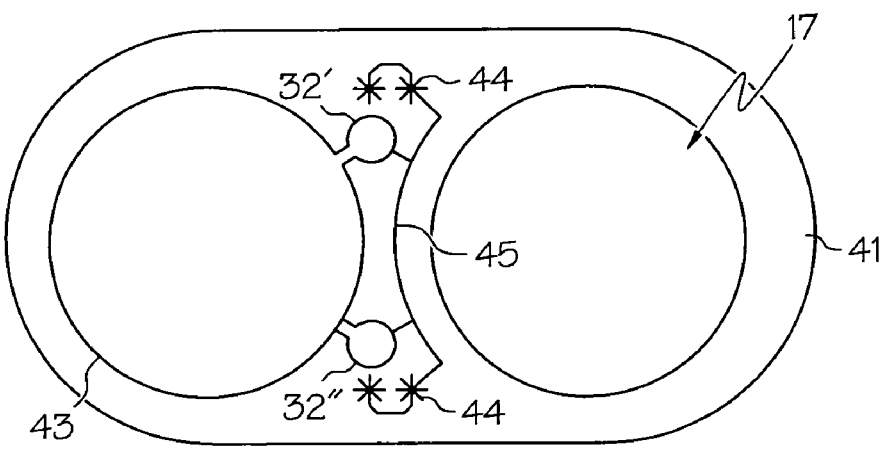
FIG. 7 is a bottom view of the top PWB from the RF apparatus of FIG. 1, illustrating a preferred circuit trace for the bottom side of the top PWB.

In this embodiment, top section 11 is a top circuit board 41, as shown in FIGS. 6–7, bottom section 12 is a bottom circuit board 21, as shown in FIGS. 2–3, and intermediate section 13 is a middle circuit board 31, as shown in FIGS. 4–5, which are assembled to form a composite body 15. These circuit boards, 21, 31, and 41 are preferably printed wiring boards (PWB's), which, together, form a complete circuit, as detailed in the simplified hardware diagram of electrical components presented in FIG. 8. Materials other than PWB's may be used for the top, bottom and intermediate sections, 11, 12 and 13, and circuit boards other than printed circuit boards may be used for these sections, and still fall within the scope of the present invention.

In order for two or more, and preferably all three PWB's, 21, 31 and 41, to form a complete electrical circuit, each board includes one or more electrical through connections, referred to generally as 32 (FIGS. 3–7).

Bottom circuit board 21 includes a plurality of small apertures or vias 28 used for electrically connecting the event detection and reporting circuitry 50 to a circuit printed on one or both sides of bottom board 21. In this preferred embodiment, elements of event detection and reporting circuitry 50 are surface mounted to a top surface of the bottom board 21 (thereby defining which board is considered the bottom board). As can be seen from FIGS. 2–3, this embodiment includes circuit traces on both the top and bottom surfaces of bottom board 21. The surface mounting of elements of event detection and reporting circuitry 50 is accomplished using any of a number of readily available methods well known to one of ordinary skill in the art.

Middle circuit board 31 (FIGS. 4–5) includes an aperture or channel that forms cavity 14 and will ultimately contain event detection and reporting circuitry 50. Middle circuit board 31 further contains at least one event detection structure 35, which in this embodiment comprises at least one aperture 34 that will contain a movable piece 36 for each aperture 34. The at least one event detection structure 35 and/or aperture 34 is electrically connected to the top and bottom circuit boards, 41 and 21, through the apertures 32 that electrically extend through the middle board 31. As can be seen from FIGS. 4–5, the preferred embodiment includes circuit traces on both the top and bottom surfaces of middle board 31.

Referring to FIGS. 6–7, the preferred circuit trace on the top surface of the top board 41 comprises a battery ground contact 43 electrically connected to a first of the at least two through holes 32' for electrically connecting the top, middle, and bottom boards, 41, 31 and 21. The preferred circuit trace on the bottom surface of the top board 41 has at least one first printed contact pattern 44 that is electrically connected through a trace 45 to additional printed contact pattern 44 and further electrically connected to a second of the at least two through holes 32'' for electrical connection to the middle and bottom boards, 31 and 21.

Referring to FIGS. 2–3, the preferred circuit trace on the top surface of bottom board 21 comprises a conductive pattern 22 that electrically connects various elements of event detection and reporting circuitry 50. The exact configuration depends upon the exact circuitry used. However, in this embodiment, the printed circuit found on the top surface further comprises at least one second contact pattern 23 that is electrically connected through a trace 24 to conductive pattern 22. Also, there is a loop antenna 25 which includes a conductive loop 56 and an antenna tuning capacitor 26. Loop antenna 25 is tuned by antenna tuning capacitor 26 and is electrically connected to the conductive pattern 22 that forms a part of a RF circuit 54 for event detection information transmission. These electrical connections to the conductive pattern 22 allow second contact pattern 23 loop antenna 25 to be utilized by event detecting and reporting circuitry 50.

Although not specifically shown in FIG. 1 a switch, such as a button type single pole switch may be included by electrically attaching the switch to event detecting and reporting circuitry 50 by electrical leads that extend through at least two of the conductive vias 28 located in bottom board 21. Preferably, however, a second circuit 51 is created on a bottom surface of the bottom board 21. This second circuit 51 is in electrical contact with the circuit trace 22 through at least one of conductive vias 28. Additionally, there may be a ground plane 29, and preferably second circuit 51 and ground plane 29 form an independent switch circuit, whereby the temporary electrical shorting of the independent switch circuit (ground plane 29 to second circuit 51), such as using an electrically conductive polymer concave button, would constitute a measurable transient event.

Figure 8:
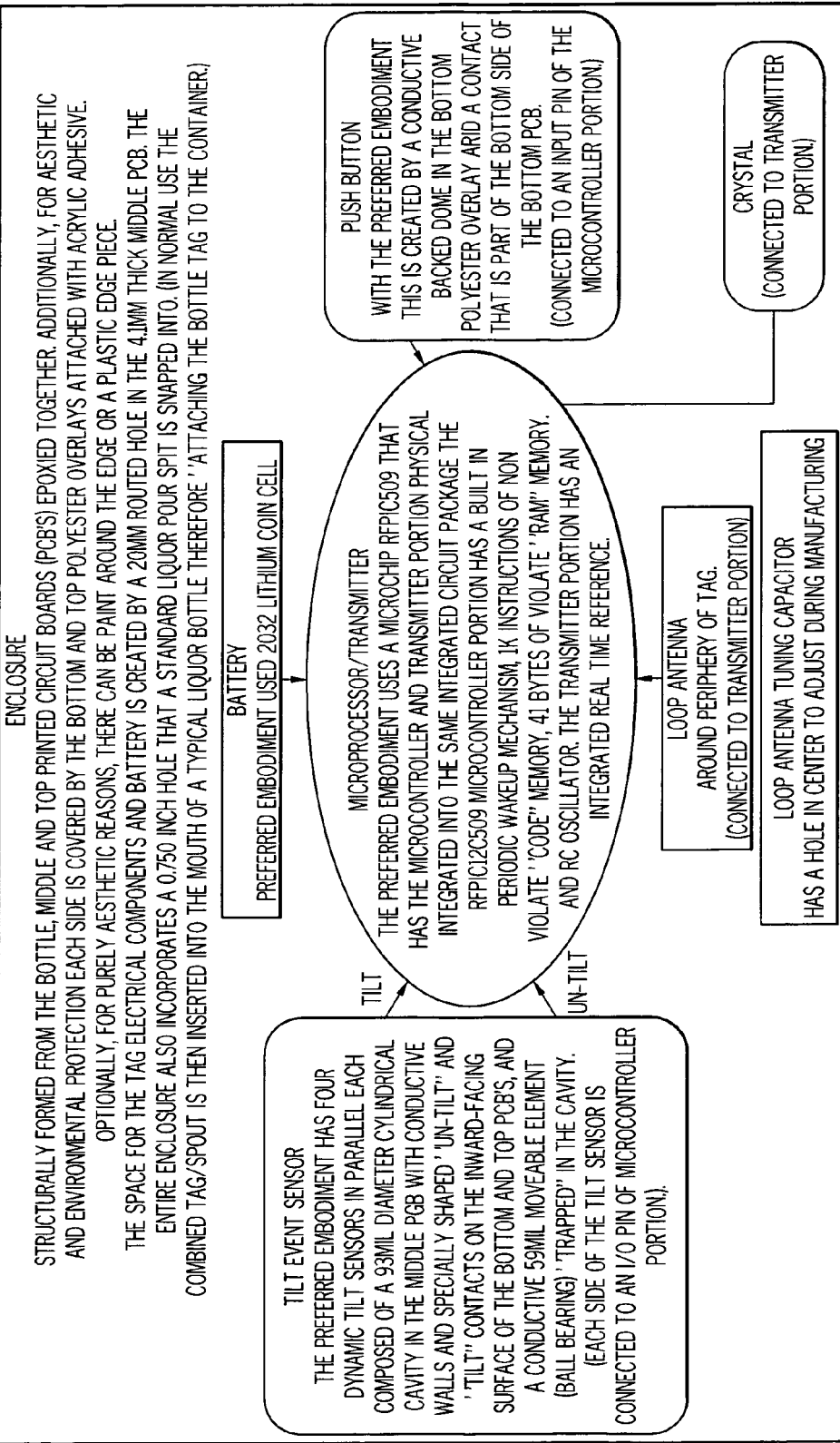
FIG. 8 is a simplified hardware logical block diagram of components of the RF apparatus of FIG. 1.

As can be seen from the simplified hardware diagram of electrical components of the RF apparatus presented in FIG. 8, the electrical circuit is preferably powered by a battery, most preferably a lithium coin cell. The battery is electrically connected to a microprocessor/transmitter that preferably has the microcontroller and transmitter physically integrated and a built in periodic wakeup mechanism, 1024 instructions of non-violate "code" memory, 41 bytes of violate "ram" memory, an RC oscillator and an integrated Real Time Reference. Electrically connected to the transmitter portion is loop antenna 25 and its associated antenna tuning capacitor 26. Also connected to the microcontroller are a crystal and, optionally, a push button that is electrically connected to an input pin of the microcontroller. Finally, there is at least one event detection structure 35 that is electronically connected to an input pin of the microcontroller. These features are discussed in more detail below in connection with a second embodiment.

The at least one event detection structure 35 in this embodiment may detect any of a number of individual or multiple events. In this embodiment, event detection structure 35 is a motion/tilt sensor that includes the above-discussed aperture 34 in the middle board 31, and the first and second contact patterns 44 and 23 printed on the top and bottom circuit boards 41 and 21. These form a container for a movable, electrically conducting piece 36 such as a metal bearing or the like. The aperture 34 may assume any number of alternate shapes, such as a square hole, a rectangular hole, an octagonal hole, or the like, and still fall within the scope of the present invention so long as it is capable of forming a container for the movable, electrically conducting piece 36. In an alternate embodiment, the aperture 34 may be beveled, yielding a shape like a frustum. In this embodiment, the event detection structure 35, which is a tilt detector, is able to detect different tilt angles, depending upon the angle of the bevel. The container may be of any suitable shape sufficient to contain the movable piece, but is not limited to a singe chamber, lobe or other size/waist variation. While a single event detection structure 35 is sufficient for event detection, this embodiment utilizes four for statistical accuracy and cost efficiency.

The patterns of the first and second contact patterns 44 and 23 have at least one edge, preferably two, that are electrically contactable with the electrically conducting piece 36 at any given rest position. Further, this at least one edge is positioned and sized such that the electrically conducting piece 36 is capable of making electrical contact between the at least one edge and conductive plating 38 on the inside surface of aperture 34.

First and second contact patterns 44 and 23 are preferably star type patterns having a central node with at least two, and preferably eight, radially extending arms. In this embodiment, the first contact pattern 44 is rotated by 22.5 degrees relative to the second contact pattern 23 in order to maximize movement perturbation of electrically conducting piece 36. Other configurations, symmetrical, non-symmetrical, matching and/or non-matching, may be used for the first and second contact patterns 44 and 23 and still fall within the scope of the present invention.

Other event detection structures 35 may be used and still fall within the scope of the present invention. In an alternate embodiment the event detection structure 35 is a motion sensor, such as can be formed by changing the contact configurations to merely measure a simple change in state. In another alternate embodiment, the event detection structure 35 is a temperature sensor, such as can be accomplished by using a thermistor or monitoring for changes in a crystal oscillator or the like.

In use, device 10, according to the this embodiment of the present invention, is associated with an asset. This association may be either permanent, such as by adhesive or the like, or removable, such as placement, attachment by hook and loop fasteners, or the like. When a transient event, such as motion, tilting, acceleration, temperature change, breakage, button press or the like occurs, device 10 detects the transient event and reports the transient event using RF communications to a remote receiver through event detection and reporting circuitry 50.

In this embodiment of event detection structure 35, which forms a motion/tilt detector, the transient event is a change of state that is detected when electrical continuity between conductive plating 38 and first contact pattern 44 is removed and replaced by electrical continuity between the conductive plating 38 and second contact pattern 23 (or vice-versa), such as occurs when the tag is moved or tilted.

In one embodiment, electrically conductive piece 36 is light enough such that when it is at rest and in physical contact with the conductive plating 38 and either first or second contact pattern 44 or 23, there is effectively no measurable electrical current flowing and consequently, effectively no power consumed. Electrical currently briefly flows when conductive piece 36 is moved across the aperture 34 and stopped by the other side (the sudden reversal of the travel direction of the conductive piece 36 allows current to flow from the conductive plating 38 through the conductive piece 36 and to one of contact patterns 44 or 23). This allows the detector to be made much smaller than previously possible and lowers manufacturing costs.

Generally, event detection structure 35 is a dynamic event detector, which is a multi-piece detector that detects a change in state caused by the movement of one of the pieces 36. In its most general form, the dynamic event detector is a container that has at least one event detection area within the container. The container holds at least one movable piece 36. An event is detected when at least one of the movable pieces 36 moves to within a predetermined distance from at least one of the event detection areas. Sufficient electrical circuitry is provided to detect a dynamic event. This circuitry discriminates the difference between the state of the movable piece at rest and bridging two contacts and the movable piece in motion and bridging two contacts, regardless of whether a rest state is measured or not. A dynamic or transient event includes, but is not limited to, a change in resistance caused by the contact of a movable piece on or near a suitable detection area, a current caused by the movement of a movable piece across a detection area, a current caused by the contact of a movable piece between two detection areas, a magnetic spin change caused by a magnetic movable piece moving near or across a detection area, a temporary change in crystal structure caused by impact of a movable piece on a detection area, a temporary change in chemical configuration, such as a cis-trans shift, caused by a movable piece, or the like.

Additionally, there may be multiple different event detectors 35, such as an electrical event detector and a magnetic event detector, which may utilize either the same movable piece 36 or different movable pieces 36.

As a specific example, the following description of the operation of various embodiments of the present invention relates to use of the these embodiments in an environment where alcoholic beverages are sold and consumed. This description is not to be taken in a limiting sense but is made merely for the purpose of describing general operating principles. Asset tag devices 10 are physically attached to assets, such as bottles of wine or to bottles of distilled spirits, perhaps using an aperture type attachment structure 17. The asset tag devices 10 are then able to detect and report transient events that occur to the bottles, such as movement, tipping, temperature changes or the like.

Figure 9:
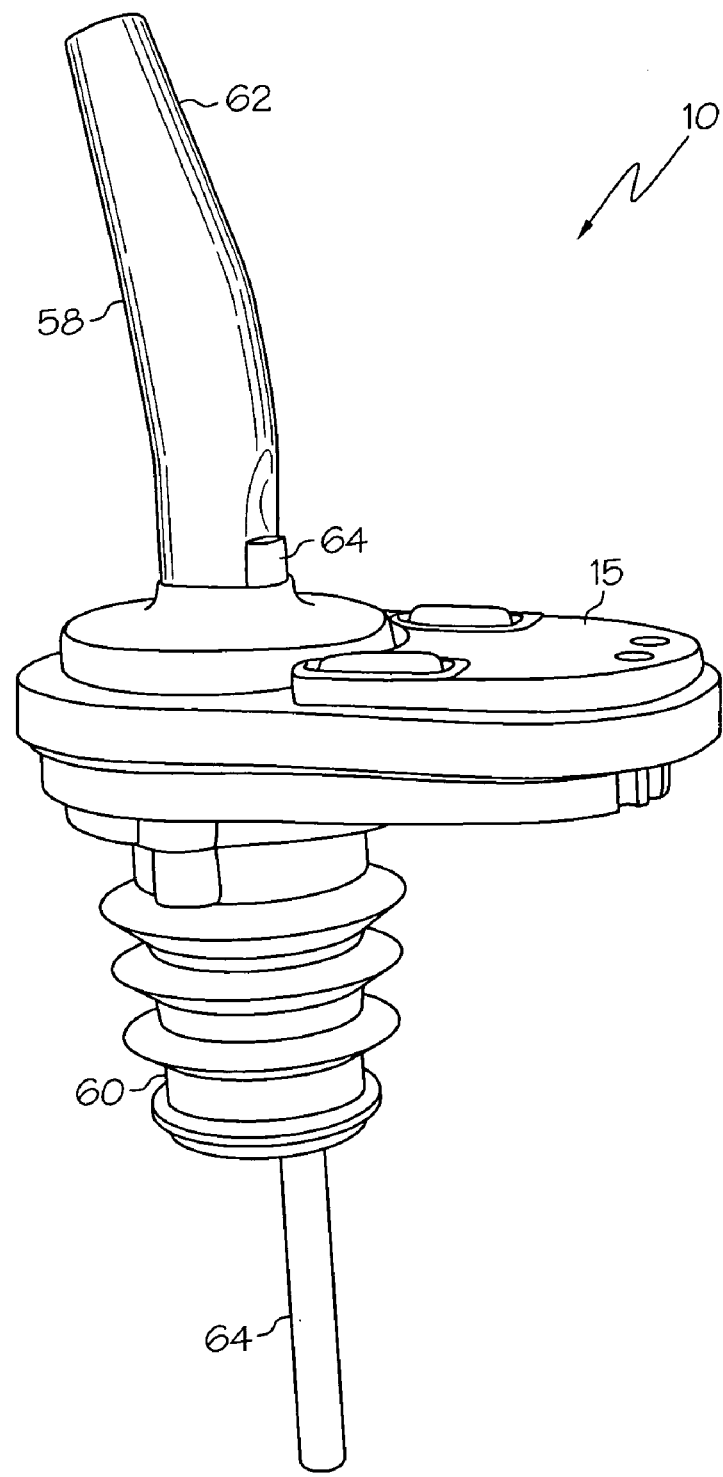
FIG. 9 is a side view of a second embodiment of an RF apparatus configured according to the present invention.

In particular, FIG. 9 is a side view of a second embodiment of an RF apparatus or device 10 configured according to the present invention. In this embodiment, not only is device 10 configured as an RF apparatus, but device 10 is also an asset tag that is configured to be associated with assets in the form of bottles in which beverages are held. And, not only is device 10 configured as an asset tag, but device 10 in this embodiment is configured as an electronic pour spout.

Pour spouts moderate the dispensation of liquids from bottles. In a typical application, a pour spout is placed in the opening of a bottle, in lieu of a bottle cap, lid, cork, or stopper. When the bottle is tilted toward an inverted position, liquid contained in the bottle flows out from the pour spout. Pour spouts aim the stream of liquid exiting the bottle in a direction that tends to be more convenient for pouring. And, they allow air into the bottle as the liquid exits so that pressure inside the bottle, and consequently liquid flow rate, remain more consistent. Moreover, pour spouts tend to reduce the rate of liquid flow exiting the bottle to a more manageable level for pouring precise amounts. An electronic pour spout integrates electronics with a pour spout. Generally, an electronic pour spout assembly is a battery-powered device that detects an event, such as the tilting of the bottle, and reports this event to a monitoring station.

Referring to FIG. 9, RF apparatus 10 includes housing 15 attached to a pour spout 58 and a hollow, resilient sealing member 60, also called a cork. As discussed above, housing 15 includes electronics. And, as discussed above, pour spout 58 and sealing member 60 may mate with housing 15 at an aperture type of attachment structure 17 (FIG. 1). Pour spout 58 includes a pour tube 62 and a vent tube 64. In this embodiment, pour tube 62 and vent tube 64 are each formed from a conductive metal for electrical conductivity properties and for the rigidity achievable with thin walls, with stainless steel being a preferred material for its ability to easily maintain cleanliness. Sealing member 60 may be molded from a suitable elastomeric material.

Figure 10:
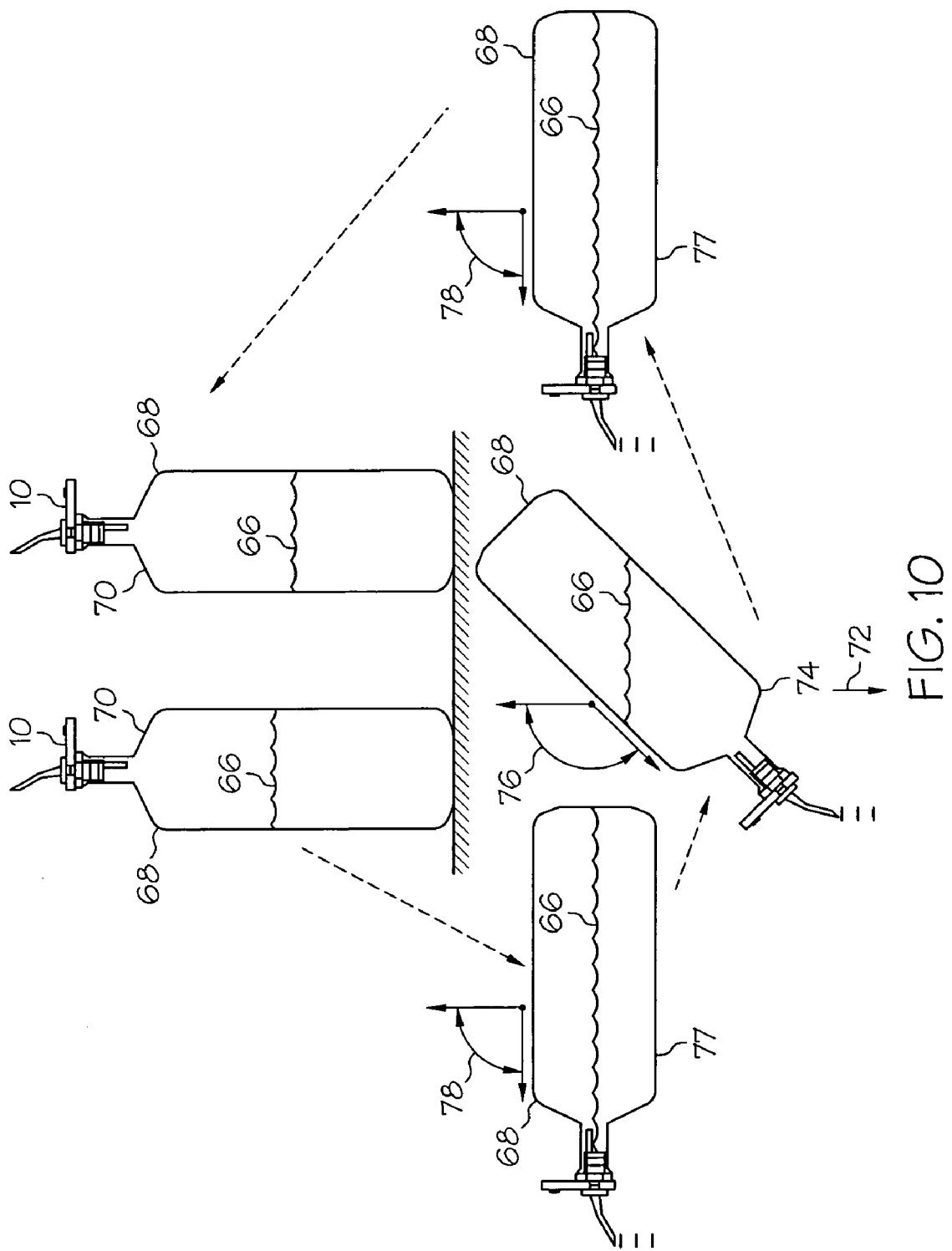
FIG. 10 shows a sequence depicting the dispensing of a bulk product from a container using the RF apparatus of FIG. 9.

FIG. 10 shows a sequence depicting the dispensing of a bulk product 66 in the form of a liquid from a container 68 in the form of a bottle using RF apparatus 10.

In accordance with this example, product 66 is dispensed by a user when the user pours product 66 from container 68 by tilting container 68. FIG. 10 depicts three different orientations for a container 68 that is equipped with RF apparatus 10 configured as an electronic pour spout type of asset tag, as shown in FIG. 9. RF apparatus 10 is a battery powered, electronic device that includes event detection structure 35 (FIG. 5) and an RF circuit 54 (FIG. 2). In an upright orientation 70, no product 66 is being dispensed from container 68. Gravity 72 keeps product 66 in the lower portion of container 68.

When it is desired to dispense product 66 from container 68, container 68 is tilted away from its upright orientation 70. Desirably, container 68 is quickly tilted to a pour orientation 74, which is greater than an angle 76 of approximately 135° displaced from upright orientation 70. So long as the tilt angle remains greater than approximately 135°, product 66 is dispensed at a roughly consistent dispensation rate regardless of the precise tilt angle. RF apparatus 10 is configured to time the duration container 68 spends at a tilt angle greater than angle 76 so that the amount of product 66 dispensed can be calculated by multiplying this duration by a dispensation rate.

But in order for pour orientation 74 to be reached from upright orientation 70, container 68 is first tilted to and through an intermediate orientation 77. In this embodiment, intermediate orientation 77 begins at an angle 78 of around a 90° displacement from upright orientation 70 and extends to angle 76. Likewise, around the completion of the dispensation of product 66, container 68 is again tilted to and through intermediate orientation 77 as container 68 is repositioned back to upright orientation 70.

Some of product 66 may be dispensed while container 68 is tilted in intermediate orientation 77, depending on the amount of product 66 in container 68, its viscosity, and other factors. But the dispensation rate is likely to be erratic and lower than the dispensation rate when container 68 is in pour orientation 74. Most bar-industry professionals consider a pour to be proper only if container 68 is tilted to pour orientation 74. In order to accurately describe the amount of product 66 dispensed from container 68 and to gain knowledge about occurrences of improper pours, RF apparatus 10 detects the duration spent in intermediate orientation 77 and the duration spent in pour orientation 74. These two orientations are sensed by the event detection structures 35 contained within body 15 of RF apparatus 10. Desirably, the timing information describing the pour event is communicated from RF apparatus 10 to a monitoring station, where the timing information may be directly processed or passed to another data processor to perform various inventory, financial, and/or management functions.

While FIG. 10 depicts a dispensation from a bottle type of container, those skilled in the art will appreciate that dispensations may also occur from other types of containers to which RF apparatus 10 may be coupled. Moreover, a container is broadly construed to mean any device or object from which product 66 may be dispensed, and specifically includes such devices as the tap handles associated with containers from which on-tap beverages are dispensed. RF apparatuses 10 may come in a variety of sizes and shapes and be configured to attach to a variety of different containers 68 and to different locations on containers 68, including at the bottom of bottles. And, RF apparatuses configured in accordance with the teaching provided herein may be used in a wide variety of RF applications other than electronic pour spouts or asset tags. As particular examples, RF apparatuses configured in accordance with the teaching provided herein may be used in connection with keyless entry devices, garage door openers, tire pressure monitors, and the like.

Figure 11:
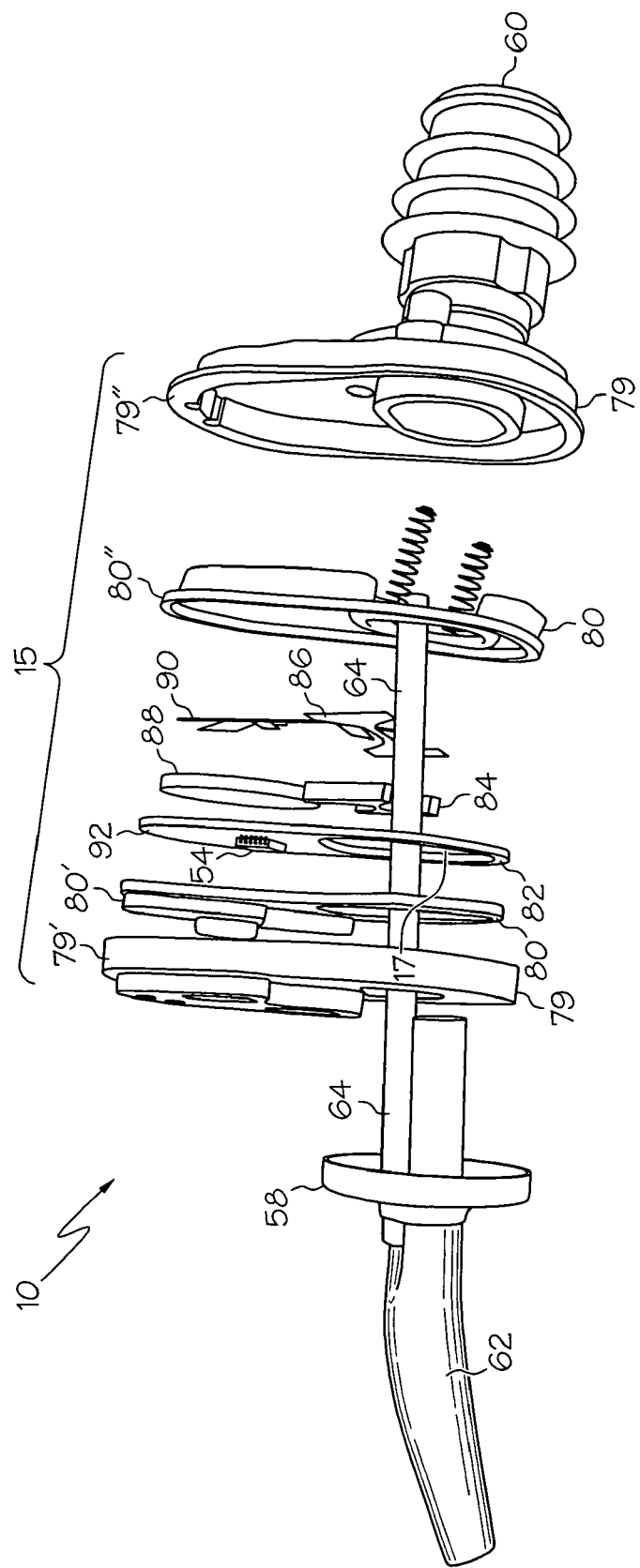
FIG. 11 shows an exploded side view of the RF apparatus of FIG. 9.

FIG. 11 shows an exploded side view of RF apparatus 10 from FIGS. 9–10. In this embodiment, body 15 includes a rigid, molded plastic outer shell 79 having a top section 79' and a bottom section 79". A pliant molded plastic inner shell 80 resides inside outer shell 79 and serves to seal its interior from the exterior environment. Inner shell 80 includes a top section 80' and a bottom section 80" which mate together when body 15 is assembled to form the seal.

Electronic circuits are located within inner shell 80. These circuits include a top PWB 82 on which conductive patterns are formed and discrete components are mounted, a middle PWB 84, and a bottom PWB 86. Top PWB 82 serves a role in this second embodiment similar to that served by bottom PWB 21 in the above-discussed first embodiment; middle PWB 84 serves a role similar to that served by middle PWB 31; and, bottom PWB 86 serves a role similar to that served by top PWB 41. Thus, middle PWB 84 and bottom PWB 86 serve to route electrical signals upward to top PWB 82 and to implement event detection structures 35, as discussed above in connection with the first embodiment. In addition, aperture 17 extends through outer and inner shells 79 and 80 and through top PWB 82. Accordingly, when assembled, electrically conductive pour spout 58 traverses top PWB 82 and extends a considerable distance on either side of PWB 82. Since pour spout 58 extends outside of body 15 on opposing sides of body 15, that considerable distance exceeds the height of any components mounted on PWB 82.

A battery 88 resides underneath top PWB 82 and beside both middle PWB 84 and bottom PWB 86, and a spring plate 90 resides under battery 88 and bottom PWB 86. In this second embodiment, none of PWB's 82, 84, and 86 or battery 88 are soldered together, but spring plate 90 causes these components to maintain physical contact and electrical connections by applying a suitable clamping pressure within inner and outer shells 80 and 79. Battery 88 is a single discrete component and is desirably as small as possible. In addition, battery 88 is non-replaceable because when body 15 is assembled top and bottom outer shell sections 78' and 78" are permanently attached to each other, using a suitable adhesive, sonic welding, or the like. Accordingly, one of the design goals for RF communications apparatus 10 is to consume electrical power as sparingly as possible so that apparatus 10 adequately performs its functions for an entire lifetime of several years.

Figure 12:
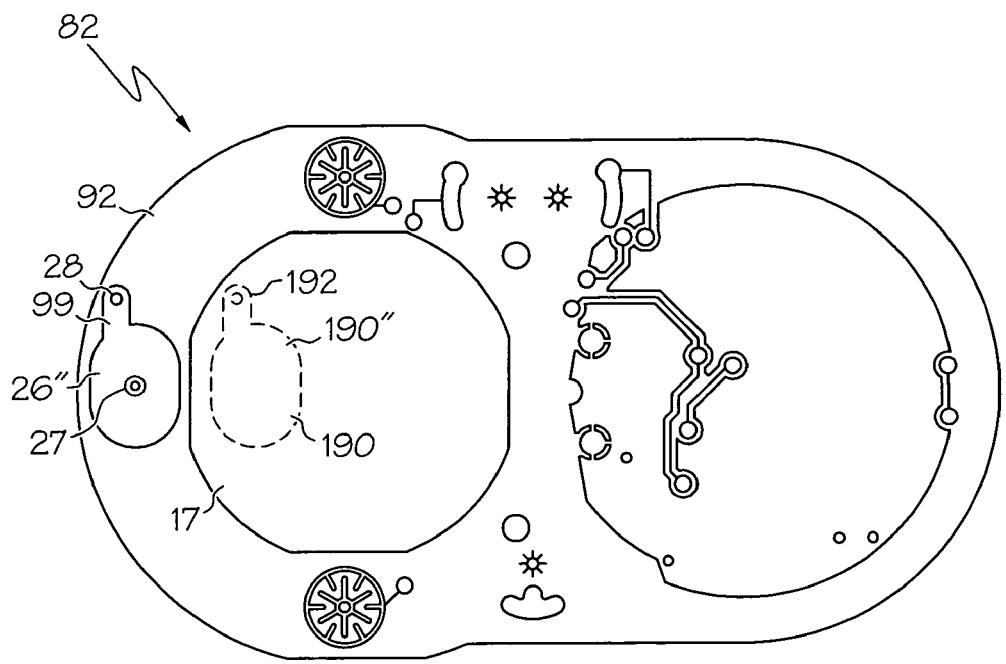
FIG. 12 shows a bottom view of a printed wiring board used in the RF apparatus of FIG. 9.
Figure 13:
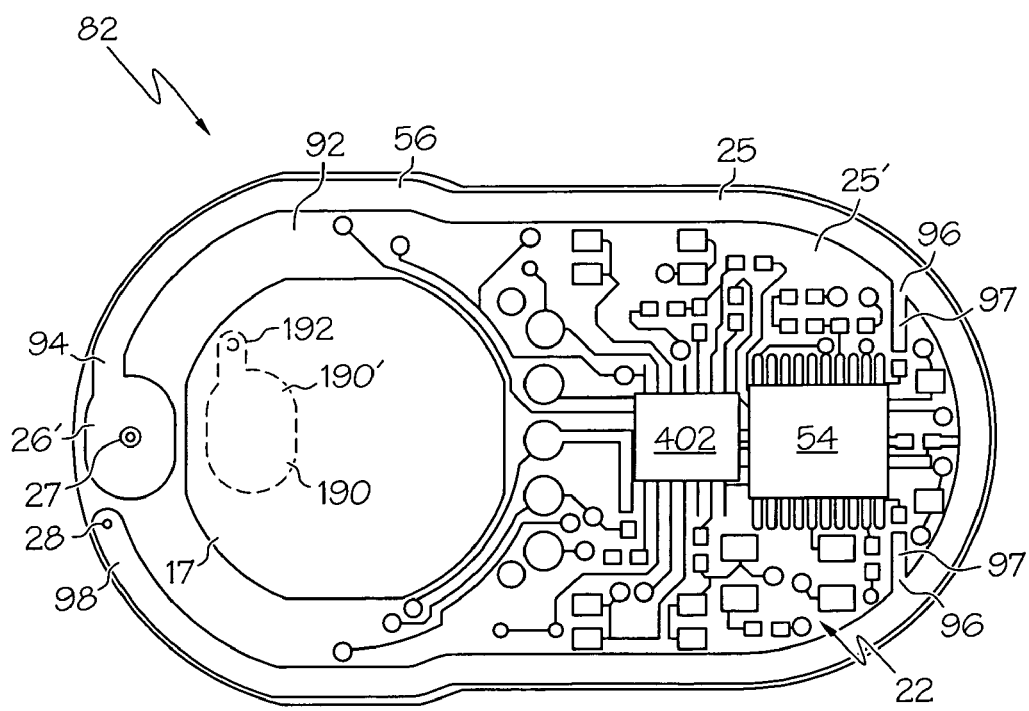
FIG. 13 shows a top view of the printed wiring board shown in FIG. 12.

FIG. 12 shows a bottom view, and FIG. 13 shows a top view, of an exemplary top PWB 82. Referring to FIGS. 12–13, top PWB 82 is formed from a planar dielectric substrate 92 with a conductive material, such as copper, on opposing sides. In this embodiment, RF apparatus 10 operates at an RF frequency in the range of 200–800 MHz. Over this frequency range, planar dielectric substrate 92 desirably exhibits a dielectric constant ($\in_r$) of greater than 4.0. And, planar dielectric substrate 92 is desirably less than 3.2 mm thick, and preferably around 1.6 mm thick. Tuning capacitor 26 (discussed above in connection with the first embodiment) includes conductive pads 26' and 26" formed from the conductive material on the opposing sides of planar dielectric substrate 92. Pads 26' and 26" are juxtaposed with one another on opposing sides of planar dielectric substrate 92 so that pad 26' directly overlies pad 26", with the material of planar dielectric substrate 92 between. This high dielectric constant and thin planar dielectric substrate 92 allow tuning capacitor 26 to be relatively small, so that RF apparatus 10 need not be larger than necessary. Fire Retardant Type 4 (FR4) is a thermoset fiberglass epoxy laminate used in the printed wiring board industry that provides one material which is suitable for use as planar dielectric substrate 92. The use of FR4 provides the advantage of making RF apparatus 10 inexpensive to manufacture.

Conductive pad 26' of tuning capacitor 26 is one of many different features formed in conductive patterns 22 on the top side of PWB 82. Conductive patterns 22 also include conductive loop 56. Conductive loop 56 and tuning capacitor 26 together form loop antenna 25. Conductive loop 56 is formed around the periphery of PWB 82, giving loop antenna 25 the greatest area of coverage possible for a given surface area of PWB 82. Greater loop areas lead to more efficient loop antennas. Conductive loop 56 includes a first portion 94 which directly contacts top conductive pad 26' of tuning capacitor 26, feed points 96 where RF circuit 54 couples to loop antenna 25 through conductive traces 97, and a second portion 98. Second portion 98 of conductive loop 56 couples to bottom conductive pad 26" through a conductively plated via 28 and a short transmission line 99 located on the bottom side of PWB 82.

Conductive patterns 22 and associated components and aperture 17 reside in an interior region 25' of loop antenna 25. As discussed above, conductive pour spout 58 traverses planar dielectric substrate 92 and PWB 82 (FIG. 11) at aperture 17 proximate conductive loop 56. Electrically conductive pour spout 58 acts as a conductive mast which electromagnetically couples to loop antenna 25 and alters the antenna pattern. In particular, many loop antennas exhibit a null in their radiation pattern, and the null extends in the plane of the loop antenna. But the inclusion of a conductive mast in the form of pour spout 58 alters this pattern so that improved RF coverage results. And, since this conductive mast extends a considerable distance on either side of planar dielectric substrate 92, the effect is greater. In this embodiment, the conductive mast provided by electrically conductive pour spout 58 extends in both directions a distance greater than the height of any component mounted on PWB 82, and even greater than the length of the major diameter of conductive loop 56.

FIGS. 12–13 also show a single test capacitor 190 in phantom, located in aperture 17. This location is proximate antenna tuning capacitor 26. Consequently, the PWB parameters, such as dielectric constant $\in_r$ and the thickness of planar dielectric substrate 92, which affect antenna tuning capacitor 26, will be nearly identical between antenna tuning capacitor 26 and test capacitor 190. As shown in FIGS. 12–13, conductive pads 190' and 190" are juxtaposed on the top and bottom sides of PWB 82, with planar dielectric substrate 92 between. Short feeder lines 192 may couple to conductive pads 190' and 190", but conductive pads 190' and 190" are desirably isolated from loop antenna 25 and the other circuits on printed wiring board 82.

The isolated test capacitor 190 is shown in phantom in FIGS. 12–13 because it is removed from PWB 82 when aperture 17 is formed, and not present in the finished RF apparatus 10. The size of conductive pads 190' and 190", and hence the capacitance exhibited by test capacitor 190, is not a critical factor but should bear a predetermined proportionate relationship to the capacitance of antenna tuning capacitor 26. As discussed in more detail below, during the manufacturing process, the capacitance of isolated test capacitor 190 is measured, and that capacitance measurement is used to select a specific hole size from a selection of hole sizes. Then, a hole 27 having the selected size is formed in antenna tuning capacitor 26, through top conductive pad 26', planar dielectric substrate 92, and bottom conductive pad 26". While hole 27 may be formed by drilling, hole 27 need not exhibit a circular cross-sectional shape. Rather, hole 27 may formed by other techniques, such as routing, and exhibit any cross-sectional shape.

Hole 27 reduces the juxtaposed surface area of conductive pads 26' and 26". And, hole 27 also reduces the dielectric constant of the space between pads 26' and 26". As a consequence, the capacitance of antenna tuning capacitor 26 is reduced.

As discussed above, RF apparatus 10 desirably operates at a predetermined RF frequency in the range of 200 MHz–800 MHz. Desirably, loop antenna 25 is resonant at the predetermined frequency to achieve the maximum efficiency. With loop antenna 25 operating at nearly its maximum efficiency, the least amount of power will be consumed in providing RF communications within a predetermined radio range. And, a more deterministic radiation efficiency results, which allows a greater achieved average power while still meeting governmental regulations. This allows RF apparatus 10 to operate with a small, non-replaceable battery 88 (FIG. 10). Viewed another way, RF apparatus 10 may use only a very small amount of power and still effectively communicate over an adequate radio range when loop antenna 25 is tuned to the desired resonant frequency.

The size of conductive pads 26' and 26" in cooperation with the dielectric constant $\in_r$ and the thickness of planar dielectric substrate 92 all initially cause antenna tuning capacitor 26 to exhibit a relatively high capacitance, which causes loop antenna 25 to be resonant at a frequency lower than the predetermined frequency for RF apparatus 10. Hole 27 is configured to lower the capacitance exhibited by antenna tuning capacitor 26 and increase the resonant frequency of loop antenna 25 to match the predetermined frequency as closely as reasonably possible for RF apparatus 10.

In addition, while hole 27 is formed between conductive pads 26' and 26" juxtaposed on opposing sides of substrate 92, hole 27 is not conductively plated to form a via. Some or all other holes or apertures 28 between conductive pads juxtaposed on opposing sides of substrate 92 may be conductively plated to form vias, if desired.

Figure 14:
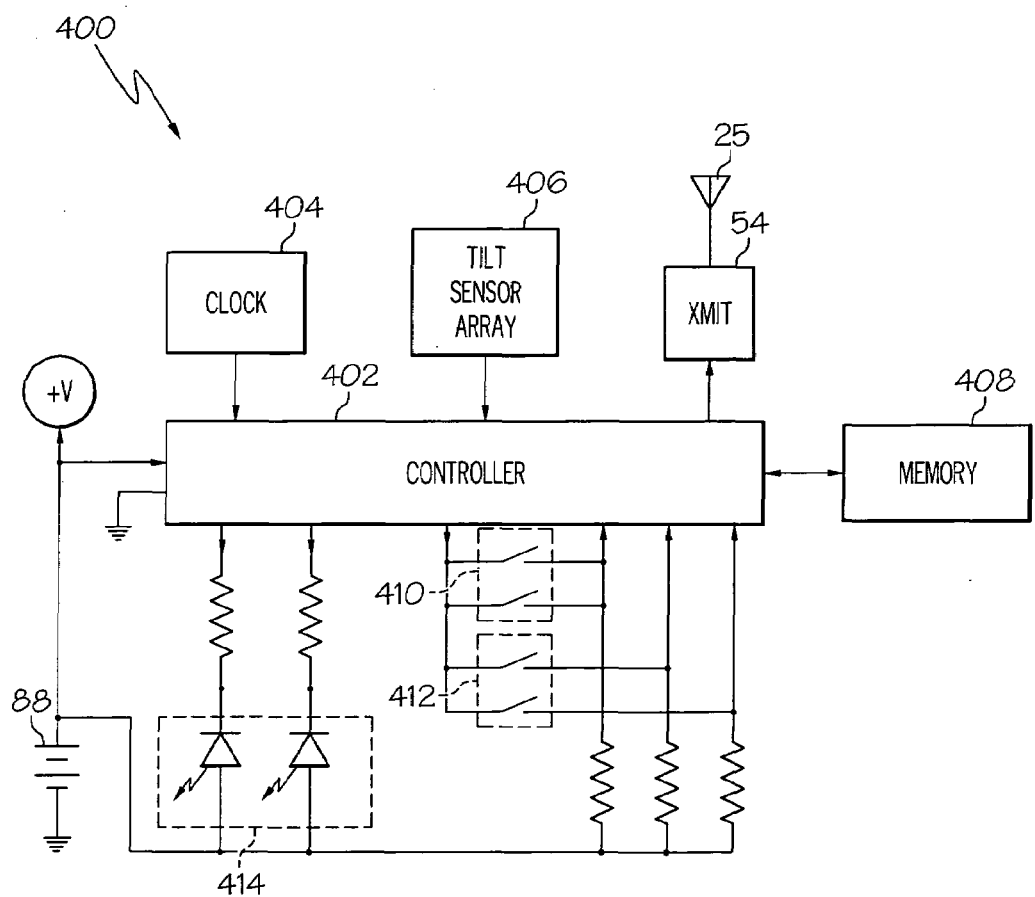
FIG. 14 shows a block diagram of an electronic circuit used in the RF apparatus of FIG. 9.

FIG. 14 shows a block diagram of an exemplary electronic circuit 400 used in this embodiment of RF apparatus 10. Circuit 400 includes a controller 402 which may be provided at least in part by a microprocessor, microcontroller, or other programmable device. Controller 402 couples to a clock 404, tilt sensor array 406, RF circuit 54, and a memory 408. Battery 88 provides electrical power for controller 402 and may directly or indirectly provide power for any or all other components of circuit 400. Clock 404 provides a time base for circuit 400. Tilt sensor array 406 provides one or more tilt sensors which indicate when RF apparatus 10 is in one or more predetermined tilted orientations relative to the acceleration of gravity 72 (FIG. 10). Using the time base established by clock 404, controller 402 determines the durations a container 68 spends in intermediate and pour orientations 77 and 74 (FIG. 10).

In the embodiment of circuit 400 depicted in FIG. 14, RF circuit 54 is a transmitter. Electronic circuit 400 uses RF circuit 54 to transmit data to monitoring stations using a wireless, RF communication scheme. No receiver is included in circuit 400, so the communication scheme is unidirectional. This communication scheme provides advantages in accommodating a wide degree of freedom in the operation of an establishment and in keeping the operation of circuit 400 at a very low power level so that a small battery 88 may be used and need not be replaced within a life span for RF apparatus 10 of several years. RF circuit 54 couples to loop antenna 25 at feed points 96 through feed traces 97 (FIGS. 12–13) and provides upconversion and amplification functions for the data communicated by RF apparatus 10. Data describing the durations that container 68 spends in the intermediate and pour orientations 77 and 74 (FIG. 10) are transmitted through RF circuit 54 and loop antenna 25 for reception by a monitoring station and further processing. In this further processing, these durations are multiplied by variables that define pour rates to determine the amount of product 66 (FIG. 10) dispensed from container 68.

Memory 408 provides a variety of functions for circuit 400. For example, memory 408 provides computer programming instructions to be executed by controller 402 in a manner well known to those skilled in the art, along with various constants and memory space for variables, tables, and buffers used by controller 402 while executing the programming instructions. Of course, those skilled in the art will appreciate that one or more of memory 402, clock 404, RF circuit 54, and the like may be included on a common semiconductor substrate with controller 402.

Controller 402 also couples to a mount detector 410. Mount detector 410 is implemented as a switch assembly that indicates whether RF apparatus 10 is mounted on a container 68 (FIG. 10). Controller 402 also couples to a user input section 412. User input section 412 is the portion of circuit 400 through which user input is provided to controller 402 and RF apparatus 10. In this embodiment of circuit 400, user input section 412 is configured as at least one, and preferably two, switches. And, controller 402 also couples to a user feedback section 414. Through user feedback section 414 controller 402 and RF apparatus 10 provide information to a user. This embodiment of user feedback section 414 includes at least one, and preferably two, light-emitting components.

An exemplary process for manufacturing device 10 according to the first embodiment discussed above is presented in FIGS. 15–16. The second embodiment desirably follows a similar process, but with some tasks omitted. This process begins with three distinct panels. Each panel includes a planar dielectric substrate 92 clad with a conductive material, such as copper, on its opposing major sides. Each panel will be formed into an array of several PWB's. FIG. 17 shows an exemplary panel 131 on which are formed a plurality of middle circuit boards 31. Similar panels are also provided for bottom and top PWB's 21 and 41. Preferably, for the first embodiment the bottom panels from which bottom circuit boards 21 are formed are 30 mil, 12×9 inch (0.79 mm, 30.5 cm×22.9 cm) panels of 0.5 oz FR4 or other materials that are commonly used as circuit boards in the industry. Preferably, the middle panels 131 for the first embodiment are 160 mil 12×9 inch panels (4.1 mm, 30.5 cm×22.9 cm) of 0.5 oz FR4 or other materials that are commonly used as circuit boards in the industry. Preferably, for the first embodiment the top panels from which top circuit boards 41 are formed are 30 mil 12×9 inch (0.79 mm, 30.5 cm×22.9 cm) panels of 0.5 oz FR4 or other materials that are commonly used as circuit boards in the industry.

Preferably, multiple individual panels are manipulated simultaneously in stacks, and multiple stacks of panels are also manipulated simultaneously. However, individual panels or individual stacks of panels may be manipulated separately and at different times from other panels or stacks and still fall within the scope of the present invention.

Figure 15:
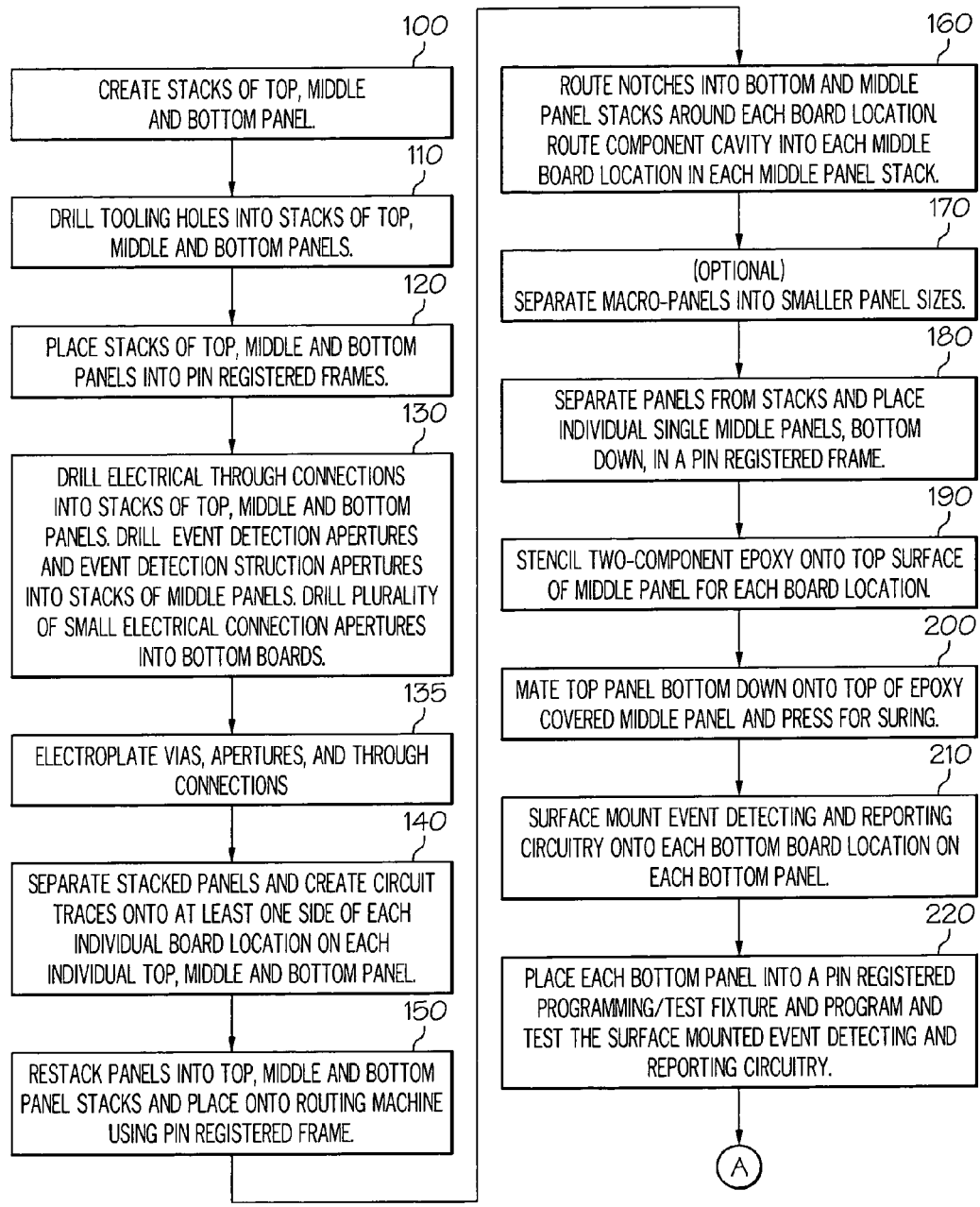
FIG. 15 shows a flowchart describing earlier tasks in a preferred manufacturing process for the RF apparatuses of FIG. 1 and/or FIG. 9.

Referring to FIG. 15, the top, middle, and bottom panels are stacked, as indicated in a task 100, and then drilled for tooling holes, as indicated in a task 110. The tooling holes allow stacks of panels and/or circuit boards to be registered or aligned to the tooling holes. The stacks of panels are then placed onto pin-registered frames for further processing, as indicated in a task 120.

For the first embodiment discussed above, in a task 130 in the stack of top panels at least two electrical through connections 32 are drilled into each top board location for electrical connection between the top, middle and bottom circuit board locations, 41, 31, and 21. In the stack of middle panels, the at least two electrical through connections 32 are drilled into each middle board location for electrical connection between the top, middle and bottom circuit boards. There are also at least one, and preferably three or four apertures 34 drilled, one for each event detection structure 35. One or more of apertures 34 may be beveled as discussed above to permit the detecting of tilts at angles other than 90°. In the stack of bottom panels, electrical through connections 32 are drilled into each bottom board location for electrical connection between the top, middle and bottom circuit boards, and a plurality of vias 28 are drilled to support interconnection between conductive patterns 22 on the top and bottom sides for electrical connection to event detection and reporting circuitry 50 in each bottom board location. The second embodiment discussed above follows a similar process, but vias 28 may be drilled in any or all of the top, middle, and bottom PWB's. The above-discussed hole 27 within antenna tuning capacitor 26 is not formed in task 130.

Next, in a task 135, conventional printed wiring board manufacturing techniques are followed to electroplate conductive material on the walls of the vias 28, apertures 34, and through connections 32 drilled above in task 130. The electroplating task 135 causes many separate conductive electrical connections to form between opposing sides of the panels.

Then, in a task 140 the stacks of panels are separated into individual panels and circuit traces, whether located on one or both sides of the boards, are created onto individual board locations using techniques common in the circuit board industry. Usually, these techniques involve a patterning and etching process, but that is not a requirement. As a result of tasks 135 and 140, conductive patterns 22, vias 28, electrical through connections 32, and event detection structure apertures 34 are formed. The conductive patterns 22 include conductive loop 56, antenna tuning capacitor 26, isolated test capacitor 190, and the like. After task 140, the separated and circuited panels are reassembled into stacks and placed onto a routing machine using a pin registered frame in a task 150.

Next, a task 160 is performed. For the first embodiment at least one, and preferably four, notches are routed into bottom and middle panel stacks around each individual bottom and middle board location, respectively. The notches in the bottom panel stacks should match and register with the notches in the middle panel stacks. Additionally, component cavity 14 is routed into each middle board location in each middle panel stack. Alternatively, this notching step could be performed on the top and middle panels.

After task 160, an optional task 170 may be performed. Task 170 is performed if the above tasks were performed on macro-panels (e.g., panels larger than 12×9 inch (0.79 mm, 30.5 cm×22.9 cm) and typically sized to accommodate four 12×9 inch panels), the stacked macro-panels are cut or otherwise separated into 12×9 inch panel stacks.

Next, in a task 180 the top and middle panels are re-separated from their stacks and an individual middle panel 131 is placed bottom down in a pin registered frame, and in a task 190 an adhesive, preferably two-component epoxy, is stenciled onto the top surface of the middle panel on each middle board location. Then, in a task 200 a top panel is mated on top of the middle panel using the pin registered frame to form a top/middle composite assembly. Multiple top/middle composite assemblies may be stacked and pressed for epoxy curing. After curing, the individual composite assemblies are re-separated from the stacks for further processing. Tasks 180, 190, and 200 may be omitted in the second embodiment discussed above because the top, middle, and bottom PWB's are held in contact with one another by clamping rather than by adhesives.

Task 210 applies to both of the first and second embodiments discussed above. Separately, whether before, simultaneously with, or after the top/middle composite assemblies are formed, the event detecting and reporting circuitry 50, including some or all of the discrete components needed by circuit 400 (FIG. 14), is surface mounted onto each individual bottom board location 21 of the separated bottom panels (first embodiment) or onto each individual top PWB 82 (second embodiment). This process is accomplished using methods that are common to the industry.

Next, in a task 220 the bottom panels (first embodiment) or top panels (second embodiment) are then placed into a pin registered programming/test fixture to program and test the surface mounted event detecting and reporting circuitry 50, including the components used by circuit 400 (FIG. 14). Circuits 50 with bad tests are noted for exclusion from use as ultimate product.

Figure 16:
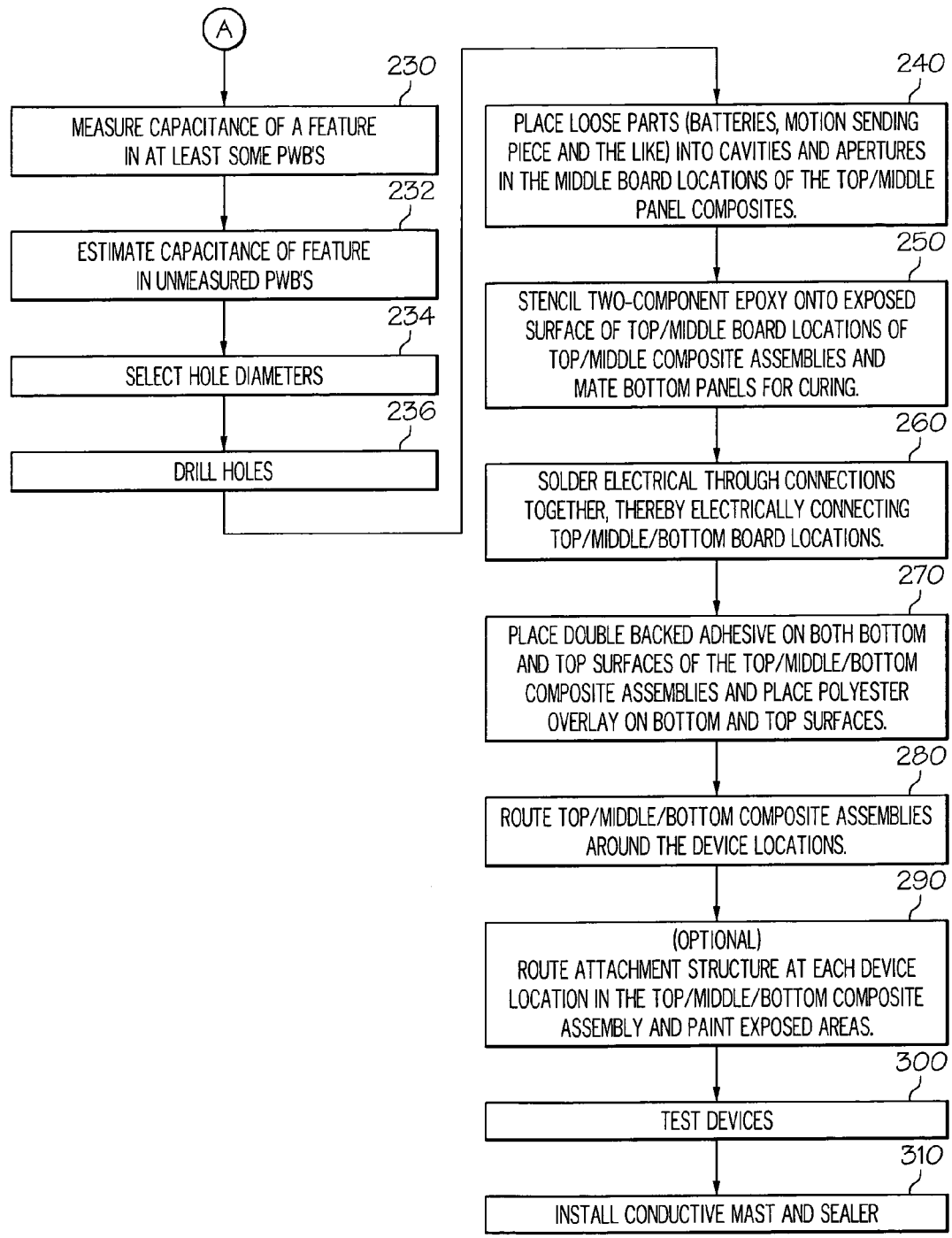
FIG. 16 shows a flowchart describing later tasks in a preferred manufacturing process for the RF apparatuses of FIG. 1 and/or FIG. 9.
Figure 17:
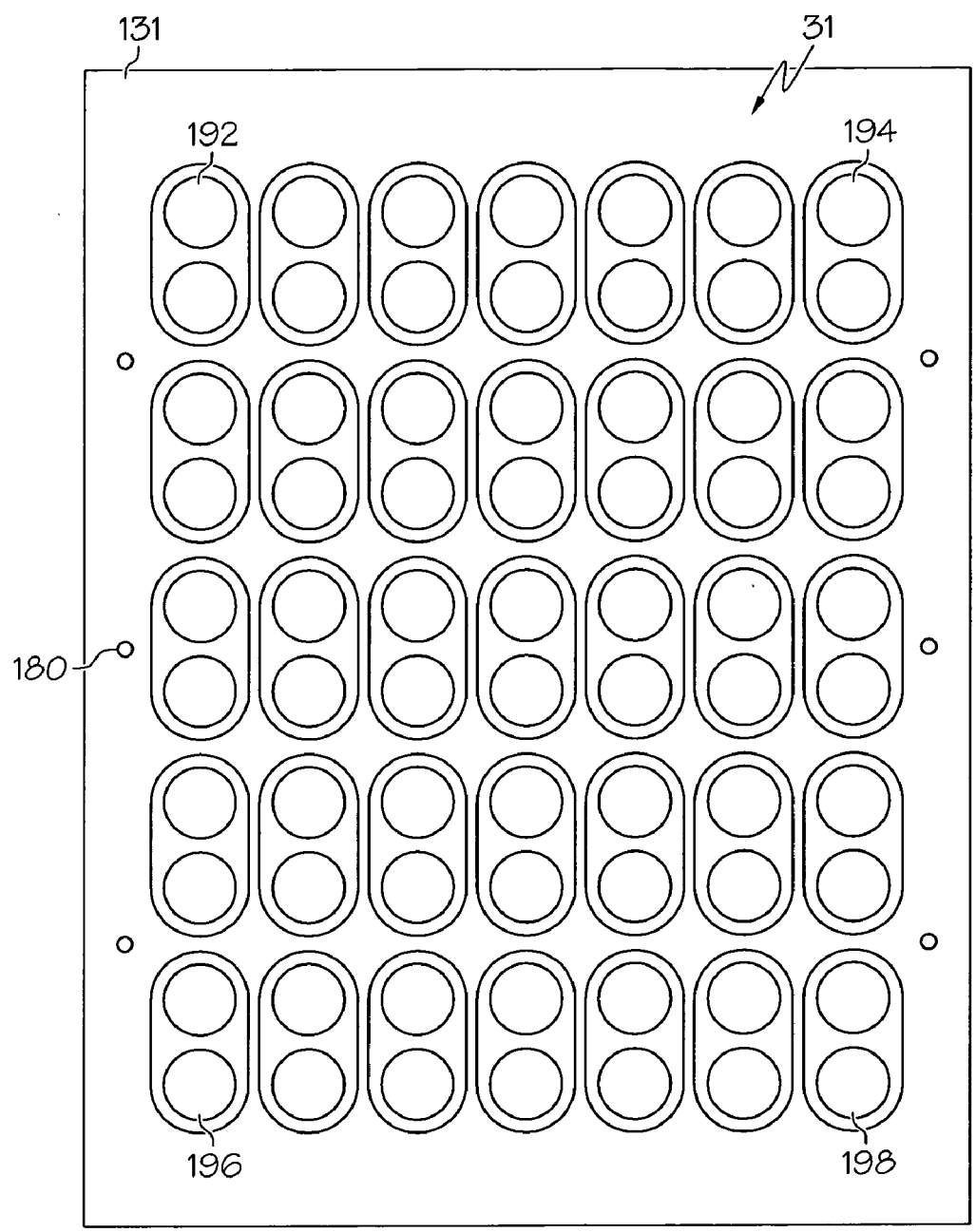
FIG. 17 shows an example of an array of board locations in a panel, specifically a middle panel, for the RF apparatus of FIG. 1.

The manufacturing process is continued in FIG. 16. A task 230 is performed for both of the above-described first and second embodiments to begin the subprocess of tuning antenna tuning capacitors 26. In task 230, the capacitances of at least some of isolated test capacitors 190 are measured. These capacitances will vary from panel to panel and even from PWB 82 to PWB 82 within a single panel. The variance will result, at least in part, from small variances in dielectric constant of planar dielectric substrate 92. If the measured capacitance is greater than a baseline capacitance, then a conclusion is reached that the capacitance of the associated and proximately located antenna tuning capacitor 26 is likewise high, and hole 27 therefore needs to have a diameter or size that is greater than a baseline. In the preferred embodiment, a table is empirically constructed that relates capacitances measured at isolated test capacitors 190 with sizes for hole 27 that cause loop antenna 25 to be resonate at the desired RF frequency. Once such a table is constructed, then loop antenna tuning for a vast number of RF apparatuses 10 may be accomplished merely by measuring capacitance, selecting an appropriate hole size, and drilling or otherwise forming hole 27 to have the selected size. And, inexpensive capacitance test equipment may be incorporated into an automated manufacturing process so that the measurement of task 230 is performed quickly and accurately without requiring human intervention.

In one embodiment, task 230 makes a capacitance measurement at fewer than all PWB's 82 or 21 that may be present in a panel. It has been observed that the parameters that influence the capacitance of antenna tuning capacitors 26, such as dielectric constant $\in_r$ and PWB thickness, tend to vary linearly over a given panel. Accordingly, in one embodiment, only isolated test capacitors 190 located in the four corners of the panel, which positions are depicted in connection with middle panel 131 in FIG. 17 at locations 192, 194, 196, and 198, are measured in task 230. These locations, except in the top or bottom PWB's, are referred to as measured PWB's herein. In this embodiment, isolated test capacitors 190 need not be formed for other PWB's on the panel, and if formed need not be tested. The other PWB's that are not tested for capacitance are referred to as unmeasured PWB's herein. The testing of fewer than all PWB's on a common panel saves time in the manufacturing process.

While the preferred embodiments use an isolated test capacitor 190 within each of at least some of the PWB's on a common panel as the feature formed within conductive pattern 22 that is measured for capacitance, alternative embodiments may select other features within conductive pattern 22 whose capacitance bears a proportional relationship to the capacitance of antenna tuning capacitor 26.

Referring back to FIG. 16, following task 230, a task 232 is performed to estimate the capacitance for the unmeasured PWB's on the common panel. In the preferred embodiment, the estimation is performed by interpolation, which pro-rata allocates any difference in capacitance for the measured PWB's to the unmeasured PWB's based on the relative location of the unmeasured PWB's relative to the measured PWB's. But those skilled in the art may devise other algorithms for estimating capacitance of the unmeasured PWB's based upon the capacitances determined for the measured PWB's.

Then, a task 234 is performed to select a hole diameter in response to either the measured or estimated capacitance for the associated measured feature of conductive pattern 22, such as isolated test capacitor 190. As discussed above, this selection may be accomplished by a table look-up operation. Accordingly, the hole size selection is compatible with an automated manufacturing process. In one embodiment, task 234 is performed for each PWB in the common panel. In an alternate embodiment, task 234 may be performed once per panel, then a common size for hole 27 is used for all PWB's in the panel.

Next, a task 236 drills or otherwise forms a hole through each of antenna tuning capacitors 26 in the common panel, where the hole exhibits the diameter or size selected above in task 234. A numerically controlled drill having a plurality of drill heads may be employed in task 236 for an automated manufacturing process, but this is not a requirement. In this embodiment, each of the plurality of drill heads is outfitted with a different size drill bit, and the selection from task 234 is fed to the drill to rotate the selected drill bit into place to form hole 27. This drilling task may be performed in a manner that is consistent with well-known PWB manufacturing processes and at very low cost.

Upon the completion of task 236, antenna tuning capacitor 26 is tuned to cause loop antenna 25 to increase the resonant frequency of loop antenna 25 so that loop antenna 25 now resonates at substantially the desired RF frequency. Antenna tuning capacitor 26 exhibits a highly precise and stable capacitance value. This precise capacitance value is obtained at very low cost because no discrete components are involved. Capacitor 26 is formed using conventional printed wiring board techniques, with only the addition of capacitance-measuring and drilling operations. The capacitance-measuring and drilling operations are quick and inexpensive to perform.

In one embodiment, at least two differently sized tuning capacitors 190 may be measured above in task 230 for each measured PWB and used to calculate the target size adjustment with even further improved accuracy. This allows compensation for PWB manufacturing variability, such as etching differences. Etching variability effects both tuning capacitors equally around the perimeter, but if one is larger in area than the other this variability factor can be accounted for.

Figure 18:
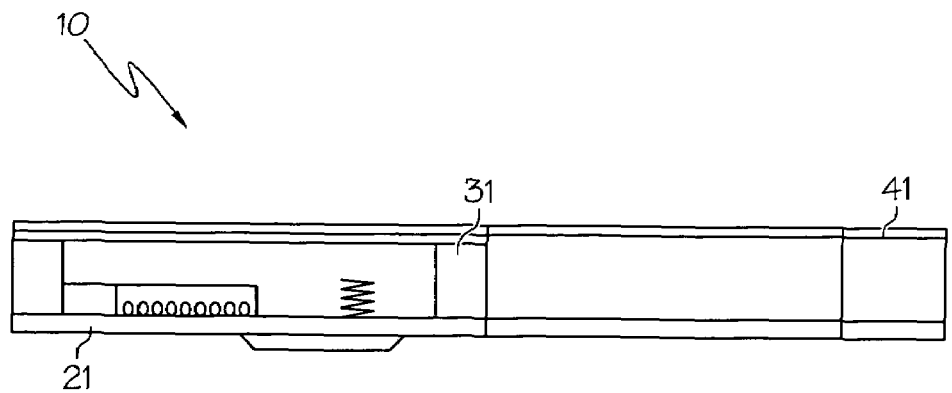
FIG. 18 is a cut-away view of the RF apparatus of FIG. 1 illustrating battery and spring contact placements.
Figure 19:
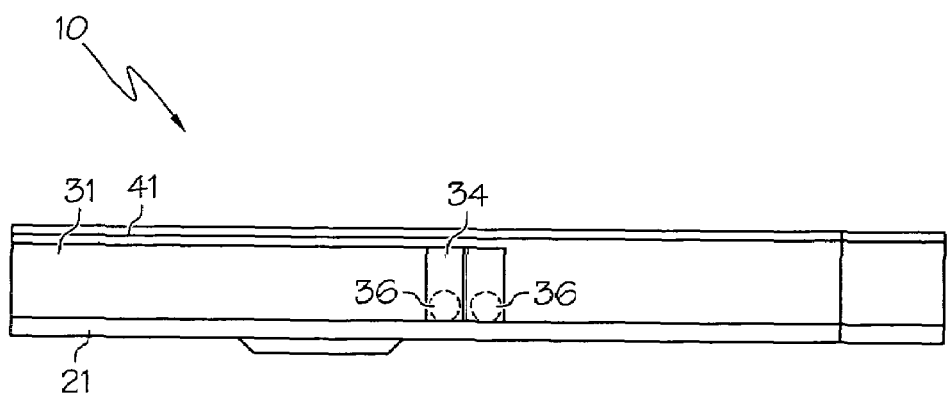
FIG. 19 is a cut-away view of the RF apparatus of FIG. 1 illustrating the placement of movable pieces in event detection structures.

Next, in a task 240 either simultaneously, or before or after the event detecting and reporting circuitry 50 is surface mounted to the bottom board locations, the re-separated top/middle composite assemblies are turned over and replaced in a pin registered frame, thereby exposing the electrical component cavity 14. For each top/middle board location in the top/middle composite assembly, battery 88 is placed into the component cavity 14 and tilt/motion sensing pieces 36 are placed into their appropriate positions in the at least one aperture 34, as shown in FIGS. 18–19.

After these components are appropriately placed, a task 250 is performed so that the exposed surface of the top/middle panel assembly is stenciled with two-component epoxy at each top/middle board location and a bottom panel with surface mounted circuitry 50 is mated to the top/middle composite assembly using the pin register frame thereby creating a top/middle/bottom composite assembly. Multiple top/middle/bottom composite assemblies are then stacked together and placed into a press for epoxy curing. Accordingly, battery 88 is now located within body 15, and body 15 is sealed so that battery 88 is non-replaceable. Next, a task 260 re-separates, the top/middle/bottom composite assemblies, and the electrical through connections 32 are soldered together, thereby creating an electrical connection between the top, middle and bottom board locations. Then, in a task 270 a double backed adhesive sheet, stenciled epoxy, stenciled adhesive, or other adhesive is used to adhere a polyester overlay to both top and bottom surfaces of the top/middle/bottom composite assemblies. Preferably, a pin registered frame is used. The polyester overlay for the bottom surface may include, in an alternate embodiment, a conductive button portion for shorting (activating) a switch circuit, such as previously described and illustrated above. Tasks 250, 260, and 270 apply primarily to the first embodiment discussed above. Some or all of tasks 250, 260, and 270 may be omitted for the second embodiment discussed above, where spring plate 90 is used instead of soldering for electrical connection between the top, middle, and bottom boards.

After task 270, a task 280 performs a final routing operation on the top/middle/bottom board assemblies. Task 280 routes everywhere except for where the notches are located in the middle and bottom board locations, thereby creating one or more devices 10 that are attached to the panel matrix via at least one small tab connecting the top boards 41 sections to the top panel matrices. Task 280 defines the perimeter of the bottom board's 21 (first embodiment) and top PWB's 82 (second embodiment) in their panels. Thus PWB's 21 and 82 are trimmed so that loop antenna 25 then resides at the periphery of each PWB 82.

Then, an optional task 290 may route an attachment structure 17, such a bottle mounting hole, into the second composite assembly at this time and any exposed interior surface may be painted to match the exterior (rubber or plastic inserts may be used instead of paint). As discussed above, isolated test capacitor 190 may have been formed in the area that is now being removed so that isolated test capacitor 190 need not take up space in the finished article.

Then, a task 300 is performed to test each RF apparatus 10. Each individual RF apparatus 10 in the array may be tested by flipping the top/middle/bottom composite assembly quickly several times. A test receiver (not shown) receives and records signals for each of the RF apparatuses 10 in the array. This verifies operation of the circuitry, the transmitter signal strength, and the operation of tilt sensors formed from event detection structures 35. Preferably, this may be performed on several stacked top/middle/bottom composite assemblies simultaneously. Additional vibration and or heat/cold cycle testing can be performed at this time. The test date may optionally be recorded on each panel prior to separation of the tags from the array.

After task 300, a task 310 may be performed to install the conductive mast provided by pour spout 58 and the sealer 60 (FIGS. 9–10). But pour spout 58 and sealer 60 is not required to be installed by the manufacturer and may be installed by a purchaser of RF apparatus 10.

The programming of RF apparatus 10 includes several functions, as described below. First, RF apparatus 10 desirably detects each transient event, such as a pour of a bottle, and the elapsed time of each event. Second, RF apparatus 10 relays pour information and any other predetermined information reliably, accurately, and timely to one or more receivers with minimum user hassle, overhead, and expense. Third, preferably, there is a button than can be used to indicate when an associated asset is empty. This button can also be used during setup to assign RF apparatus 10 to a specific asset, a receiver, or host software. Alternately, the button can be used to transmit an information request to a receiver or host software.

The preferred embodiment of RF apparatus 10 is designed with a three year functional lifetime for practical and reliability reasons. To support the limited functional lifetime, RF apparatus 10 preferably comprises an internal 32-Bit Life Timer that starts at zero and increments when RF apparatus 10 is in an unused or untilted position. This allows users to store currently unused devices 10 in a used/tilted position until they are needed. After the 32-Bit Life Timer counts little more than three years, software in RF apparatus 10 will disable functionality of RF apparatus 10. Other time durations may be used and still considered to fall within the scope of the present invention.

RF apparatus 10 may have at least two discrete event detection sensors, preferably a tilt sensor and a button. To minimize the latency of data transmission to the host, when collecting event data RF apparatus 10 transmits the event detection data immediately after detection. In the case of a button press, this means as soon the button is pressed without waiting for it to be released. For a tilt event, it is after RF apparatus 10 is tilted and then untilted. Preferably, event data for a tilt event includes the length of the tilt. In alternative embodiments, only one event detection sensor may be used. Other event detection sensors may be used, such as motion, temperature, acceleration, breakage (of the asset or RF apparatus 10), tire pressure, and the like. All such options are considered to fall within the scope of the present invention.

This immediate data transmission is called an Immediate Mode Transmission. It may include the immediate event data as well as a multitude of other data, which may include but is not limited to, a unique preferably 32-bit tag identification number (ID), multiple (preferably 15) previous events, a current event number, a life timer value (to determine the age of RF apparatus 10), and a cyclic redundancy check ("CRC").

When RF apparatus 10 is located within a realistic range from a receiver, typically about 50 feet, then a large majority (95% or more) of Immediate Mode Transmissions will be successfully received by the receiver. Reasons for unsuccessful reception include, but are not limited to, transmission collisions with another simultaneous transmission or spurious interference from other unrelated radio energy sources. In order to prevent the loss of data, RF apparatus 10 program comprises an event buffer that stores a number of the most recent, preferably 16, events. Therefore, each Immediate Mode Transmission not only contains the most recent events but also the previous 15.

Because there may be long time durations between detected events, if only Immediate Mode Transmissions were sent, then there could be a lengthy latency in transferring data if an Immediate Mode Transmission was not successfully received. Therefore, there are Beacon Mode Transmissions that are periodically transmitted, whether there are new events or not. There are two types of Beacon Mode Transmission, slow and fast, with the only difference being the frequency of transmission. Preferably, device 10 will always transmit a Slow Beacon Transmission for a first fixed duration, preferably every five minutes, when untilted. However, after an event occurs (and an Immediate Mode Transmission Occurs) RF apparatus 10 switches to Fast Beacon Mode. RF apparatus 10 then sends a Fast Beacon Transmission for a second, short duration, preferably every ten seconds, for a third intermediate duration, preferably for one minute, and then switches back to Slow Beacon Mode. This decreases any latency of any new event data being collected by the system. It also allows more accurate "time-stamping" of the detected event. Lastly, it dramatically decreases the likelihood of losing event data. Other durations may be used and still considered to fall within the scope of the present invention.

Beacon Mode Transmissions provide another function in addition to handling data latency problems. It also prevents data loss from occurring when devices 10 are moved temporarily out of the range of the receiver. For example, in a single receiver system, RF apparatus 10 may be temporarily moved out of receiver range to pour a drink. Because the event is stored in the memory of RF apparatus 10, when RF apparatus 10 is brought back in range, the receiver will collect the new data during the next successful Beacon Mode Transmission. Thus, no data will be lost as long as less than 16 events occur before a successful Beacon Mode Transmission. This allows an asset to be used or stored out of range as long as it is periodically moved into receiver range.

In order to facilitate the event buffer mechanism, RF apparatus 10 also maintains a (preferably 24-bit) Event Number that starts out at 0 when RF apparatus 10 is first manufactured. Each time there is a new event, this Event Number is incremented. In each transmission, Immediate and Beacon, not only are the data for the 16 stored events included in the transmission but also the entire 24-bit Event Number. This serves several purposes. First, since the 16 event buffer is continually reused in a circular fashion, the lower 4 bits of the Event Number will always be pointing to the oldest event entry in the event buffer. For instance, before any events have occurred, when RF apparatus 10 is first manufactured, the Event Number will be 0 meaning there were no events, ever, for this RF apparatus 10. After a first event, the event data will be stored in roll-over buffer location 0 and the Event Number will be incremented to 1.

After the 16$^{th}$ new event the new data will be stored in the 16$^{th}$ location and the Event Number will be 16. The 17$^{th}$ new event is then stored in location 0 and the Event Number will be 17.

Based on the Event Number, the receiver can determine how many new events are contained in RF apparatus 10. This is accomplished because the very first time a receiver receives a transmission from a particular RF apparatus 10, it records all 16 stored events and then stores the current Event Number for that RF apparatus 10. Subsequently, every time a transmission is successfully received by the receiver from that RF apparatus 10, the receiver or host software compares the Event Number in the transmission to the stored Event Number for that device. If the Event Number does not change, then there were no new events. If, for example, the Event Number increases by three, then receiver records the three new events.

The Event Number is also stored with the data for that event in the host software. This facilitates multi-receiver systems because in many cases more than one receiver may store the same events from the same RF apparatuses 10. However, the host software can determine duplicates because it also keeps track of the Event Numbers. For example, if device #123 has a current Event Number of 55, and is in range of two receivers, then both receivers will have stored that the last event for device #123 was 55. If device #123 is then tilted, the Event Number will increment to 56. If both receivers successfully received a transmission from device #123, then they will both store the new event data and both update the current Event Number for device #123 to 56. When the host software collects data from the first receiver, it will verify and determine that it does not have Event Number 56 from device #123 yet. However, when it collects the data from the second receiver, it will know it already has that event data and not save the duplicate.

The Event Number also allows the system to detect if more than 16 events have occurred since a successful transmission reception from RF apparatus 10. For example, if an RF apparatus 10 is taken out of realistic range of any receiver and 19 events occur and then it is brought back into range of at least one receiver, that receiver will detect that there are 19 new events but knows that only the latest 16 are in the transmission and will only store those data. After the host software collects the data from all receivers it will detect that there are 3 missing events for that RF apparatus 10. It can then generate a warning on any reports where this would be relevant.

The receiver stamps and records the time each transmission is received. In addition, the receiver stamps and records a value for each event that represents the time the event occurred or may have occurred ("Possible Age"). The Immediate Mode, Slow Beacon, and Fast Beacon Transmission may be configured the same except for an identifier at the beginning that tells the receiver which type of transmission is being received. The main reason for this is to allow the receiver to time stamp the events more accurately. In order to conserve memory in RF apparatus 10, RF apparatus 10 need not keep track of the chronological time an event occurs but only the order. Because an Immediate Mode Transmission is sent right after the event and it has a field indicating to the receiver it is an Immediate Mode Transmission, the receiver time stamps the new event with a Possible Age equal to the time the transmission was received. In rare cases, the Immediate Mode Transmission may not be successfully received. If that occurs, then if the next Beacon Mode Transmission a receiver receives is a Fast Beacon Transmission, the receiver knows the latest event happened less than one minute ago. The receiver still time stamps the data with the current time but also stores a value called Possible Age indicating the event happened up to a minute before. The receiver also checks if it had heard from RF apparatus 10 less than a minute ago and sets the Possible Age to whichever is less. If an Immediate Mode Transmission is not received and the next received transmission is a Slow Beacon Transmission, then the Possible Age for the new event is set to the length of time since RF apparatus 10 was last heard from by that receiver. If there is more than one new event, then all the events before the newest event get time stamped with the current time and the Possible Age of the length of time since RF apparatus 10 was last heard from by that receiver. The additional transmission of the chronological time of the event is an option that is considered to fall within the scope of the present invention. In addition, the calculation and storage of system data can be performed in RF apparatuses 10, receivers, host software, or a combination thereof, and all such options are considered to fall within the scope of the present invention.

RF apparatus 10 may has a 16 Event Buffer, each one byte in length to conserve memory. This means all events are desirably encoded in one byte (a number between 0 and 255). Preferably, RF apparatus 10 stores a Button Press Event as the value 255. Event times are stored with a resolution of $\frac{1}{16}^{th}$ seconds. This means the largest duration of an event could be is $^{254}/_{16}$ths or 15.875 seconds. To support times longer than this, the value 254 is also reserved to indicate that the time is $^{253}/_{16}$ths or greater. The remainder of 16ths is stored in the next event. Unless this is also larger than $^{253}/_{16}$ths. Preferably, events of up to 127 seconds are cascaded in this manner. The Event Number is incremented for each entry even though it is part of the same event. The host software combines these cascaded events into one record in the software database. In the preferred embodiment, if the time is 127 or larger only a total of 127 is stored. The host software considers this a special case that is stored as 127 or more and it would be an exception noted to the user on any relevant reports. Different numbers may be used and would be considered to fall within the scope of the present invention.

The system can determine when an RF apparatus 10 stops being heard from. To allow for this, a receiver stores the last time it heard a transmission from an RF apparatus 10 even if no new event is transmitted. If no receiver hears from an RF apparatus 10 for a length of time that may be predefined or set by a user, preferably 15 minutes, then host software can generate a warning that the RF apparatus 10 is missing. The system may then inform the user of the last time the RF apparatus 10 was heard from. If the RF apparatus 10 is heard from again, the system may then indicate the time the RF apparatus 10 was found. This allows a user to have confidence that all assets are where they should be, that all RF apparatuses 10 are functioning, and that all data has been collected (at least all data that occurred in the last 15 minutes or other configured warning time).

It is desirable that RF apparatus 10 last as long as possible with as small as possible of a battery 88. Thus, RF apparatus employs many design features to minimize power consumption. One power reduction technique is that RF apparatus 10 hardware and software are designed so that, in general, RF apparatus 10 is often "sleeping" or in a powered down mode that minimizes power consumption. However, RF apparatus 10 has a "wake timer mechanism" that "wakes" RF apparatus 10 after a predetermined duration. Preferably, this is about $\frac{1}{27}^{th}$ of a second. If no event occurs, RF apparatus 10 wakes about each $\frac{1}{27}^{th}$ of a second and if untilted just updates the Life Timer with the time it was sleeping. If RF apparatus 10 is currently tilted then it increments the Tilt Timer by how long it was sleeping.

To facilitate lower cost, lower power usage, and smaller size, the preferred wakeup mechanism is a simple RC (resistor-capacitor) timer or RC oscillator. By itself, the RC timer is not very accurate and would be slightly different between different devices 10 and would also vary for the same device 10 based on temperature.

RF apparatus 10 preferably keeps the life timer and determines tilt times as accurately as possible. Thus, RF apparatus 10 occasionally adjusts the current time constant of the RC timer. It does this by periodically comparing it to an accurate crystal oscillator. Preferably, RF apparatus 10 does this once per hour and whenever an event is detected (in order to calculate event times as accurately as possible in the cases where temperature may have changed in the last hour). This method does not increase the cost, size, or component count of RF apparatus 10 because it already has a crystal oscillator to support the radio transmitting function. The crystal oscillator takes more power than the RC timer but it only takes a few thousandths of seconds to do the comparison (and preferably only once per hour), so the overall power consumption is only minutely more than the RC timer. A potentially useful function of this RC timer/ crystal synchronizing technique is RF apparatus 10 also can measure temperature variations.

While stored, RF apparatus 10 can be turned over to a tilted state. While in this tilted state, RF apparatus 10 does not transmit Beacon Transmissions. In addition, after 127 seconds in a tilted state, RF apparatus 10 switches the RC timer to wake it up less often to have even lower power consumption, preferably every 2 seconds.

Preferably, when RF apparatus 10 wakes up, it supplies voltage to the tilt sensor contact patterns, 23 and 44, on the top and bottom boards in the above-discussed first embodiment to determine whether a sensor is shorted. This is used to determine static tilt. However, no static short may exist while RF apparatus 10 is temporarily awake. Therefore, RF apparatus 10 also determines dynamic tilt by having a short to a sensor wake it up. Preferably, this is accomplished by having each sensor connected to the In-Out pins of the microcontroller in RF apparatus 10. RF apparatus 10 software only enables the contact configuration on the opposite side to wake it. In other words, if currently untilted, then RF apparatus 10 only enables the contact configuration on currently the "top" (tilted) side to wake it up. If RF apparatus 10 is flipped over, then a dynamic short will wake it up. RF apparatus 10 knows if it was woken up by the pin change feature so even if no static short is detected it knows it must now be tilted. It then reverses the contact configuration so that the one on the bottom (untilted) side will be the active one. This saves power because the inactive contact configuration will have no voltage applied to it so no power is wasted in the case that there is a static short.

A transmission protocol for Immediate/Slow Beacon/Fast Beacon Transmissions from RF apparatus 10 may be formatted as follows:

48 bit synchronization (sync) sequence composed of "11110000 11110000 11110000 11110000 11110000 11100010";

6-bit packet type (preferably 0);

2-bit transmission type (preferably, 00 means immediate, 01 means slow beacon, and 10 means fast beacon);

32-bit device 10 ID number;

8-bit life timer (only the most significant 8 bits of the 32-bit internal value);

8-bit timer calibration value (this may be converted to temperature by the host software because it will vary linearly with temperature);

24-bit Event Number;

Sixteen 8-bit event buffer entries;

16-bit CRC in the CCITT-16 convention (used to make sure the transmission was received correctly by the receiver); and 4-bit sequence of "0011" used to be able to determine signal strength by the receiver. It does this by taking a signal strength sample during the 0's and then during the 1's and comparing the difference.

Of course, different bit lengths, different amounts, different numbers, and different sequences may be used and all such options are considered to fall within the scope of the invention.

Preferably, with the exception of the initial 48-bit sync sequence and the last 4-bit sequence, all actual data is Manchester Encoded. This means that each data bit is actually converted to a 2 bit Manchester sequence of "01" or "10". A data bit of "0" is converted to a two bit "raw" sequence of "01" and a data bit of "1" is converted to a two bit "raw" sequence of "10". This is for many reasons. First the preferred transmission method for RF apparatus 10 is On-Off-Keying (OOK). This means that radio frequency energy is being generated to transmit a "1" and no radio frequency energy is being sent to transmit a "0". Because, from the receiver's point of view there is always background radio noise even when no device 10 in range is transmitting, the receiver "averages" the current radio frequency energy received in the last $\frac{1}{100}^{th}$ of a second or so and then compares the instantaneous received RF energy to this average. If it is greater, than it assumes a raw bit "1" and, if lower, it assumes a raw bit "0".

Preferably, all RF apparatus 10 transmissions contain an equal number of "raw" 0's versus "raw" 1's. Converting each data bit to a "raw" two bit balanced sequence ("01" and "10") accomplishes this. This is also the reason the transmission starts with the 48 bit balanced (equal number of "raw" 0's and 1's) sync sequence. This gives the averaging mechanism in the receiver time to stabilize. Additionally, the sync sequence used by the system will ensure that the receiver will not mistake the sync sequence for valid data.

If a proper sync sequence is received, the use of Manchester Encoding helps the receiver determine whether a transmission is being successfully received. This is because the only valid "raw" sequence after the synchronization sequence will be "01" or "10" for each actual data bit. Therefore, the receiver knows there is a reception error if "00" or "11" occurs in any "raw" two bit sequence following the sync sequence, and it abandons the decoding. If all the data bits (each two bit raw sequence) are received, the transmission is further validated by the receiver using the 16-bit CRC value.

Other methods of transmission and encoding may be used and are considered to fall under the scope of the present invention.

Because, in the preferred embodiment, RF apparatuses 10 transmit for a very short time period (typically $\frac{1}{100}$ths of a second) and only every five minutes or when an event occurs, collisions between two RF apparatus 10 transmissions will be rare. If a collision does occur between two transmissions, it would be expected that the system would not decode either transmission. However, the present invention is designed to more likely receive a transmission from closer RF apparatuses 10 in the event of a collision. For example, in one potential application, a user may have multiple bar areas each with multiple RF apparatuses 10 attached to bottles and at least one receiver in each bar area. Depending on how close the bar areas are to each other, a transmission from an RF apparatus 10 may be picked up by a receiver not only in that bar area but also in other bar areas. If an RF apparatus 10 is transmitting and a receiver starts to hear a transmission from another RF apparatus 10 that is further away, depending on the strength of the signal (or energy of the transmission) of the two RF apparatuses 10, the receiver will continue to decode the proximate RF apparatus 10 and ignore the distal RF apparatus 10. Conversely, if a distal RF apparatus 10 is picked up by a receiver and a proximate RF apparatus 10 starts to transmit, the distal RF apparatus's 10 transmission will be abandoned in favor of the proximate RF apparatus 10. The sync sequence used guarantees that an invalid data bit sequence will occur during the reception of the distant device when the proximate RF apparatus 10 starts to transmit. The receiver can then stop decoding the transmission from the distal RF appartaus 10 and instead decode the transmission from the proximate RF apparatus 10. Advantageously, the protocol used by the system allows a user to have more RF apparatuses 10 in an area by adding additional receivers in the area.

In implementing this functionality and protocol, software with specific functionality is programmed into the circuitry 50 of the present invention.

Figure 20:
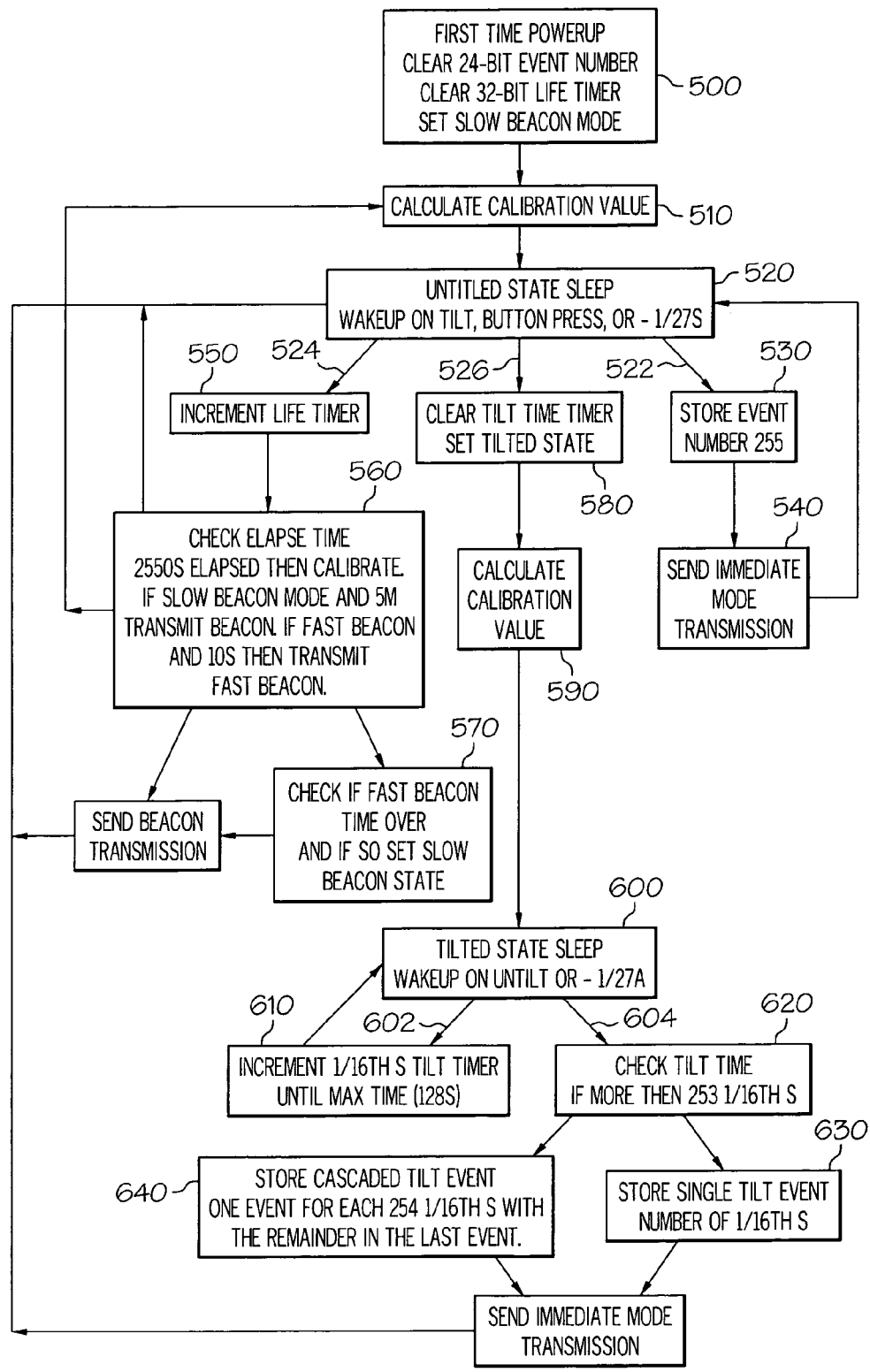
FIG. 20 is a flow chart of the functionality of software for the RF apparatuses of FIG. 1 and/or FIG. 9.

FIG. 20 is a flow chart of such functionality for either embodiment of RF apparatus 10 discussed above. The preferred software begins at a task 500 upon first power-up, which clears a 24-bit event number, clears a 32-bit Life Timer, sets the slow beacon mode in effect, and sets the untilted configuration or mode.

A calibration value is calculated in a task 510. Then RF apparatus 10 goes into an untilted sleep state, depicted by a task 520, but will wakeup upon a tilt event, a button press, or after $1/27$ths of a second.

Upon a button press, event 522, the event is stored in the first available memory location. Block 530. After the event is stored, an Immediate Mode Transmission is triggered, thereby transmitting event data to a receiver Block 540 and RF apparatus returns back to untilted sleep state Block 520.

An event 524 occurs upon $1/27^{th}$ of a second time duration. Upon the occurrence of this event, the Life Timer is incremented in a task 550. Then, a task 560 checks the elapsed time. If the elapsed time is 2560 or more seconds, then program flow returns to recalculate the calibration value at task 510. If the Slow Beacon Mode is in effect and 5 minutes have elapsed, then RF apparatus 10 triggers a Slow Beacon Transmission and RF apparatus 10 returns to its sleep state at task 520. If the Fast Beacon Mode is in effect and 10 seconds have elapsed, then RF apparatus 10 checks to see if the Fast Beacon Mode should be changed to the Slow Beacon Mode (and, if so, unflag the Fast Beacon Mode and flag the Slow Beacon Mode). Next, a task 570 triggers a Fast Beacon Transmission, and RF apparatus 10 returns to its sleep state at task 520.

Upon the occurrence of a tilt event 526, RF apparatus 10 clears the tilt time timer and sets the state to "tilted" in a task 580. Next a task 590 calculates a calibration value, and a task 600 causes RF apparatus 10 to enter a tilted sleep state. After $1/27$ths of a second has elapsed, event 602 will occur, and in a task 610 RF apparatus 10 increments the tilt timer by $1/16^{th}$ of a second, until the maximum time of 127 seconds has been reached, and returns to its tilted sleep state at task 600.

After RF apparatus 10 has been untilted, an event 604 will occur, and the tilt time is checked in a task 620. If the time is less than 253 $1/16^{ths}$ of a second, then RF apparatus 10 stores the number of $1/16^{ths}$ of a second for the event duration in a task 630, and RF apparatus triggers an Immediate Mode Transmission. If the time is more than 253 $1/16^{ths}$ of a second, RF apparatus 10 stores a cascaded event in a task 640 (one event for each 254 $1/16^{ths}$ seconds with the remainder in the last event) and RF apparatus 10 then triggers an Immediate Mode Transmission. After triggering the Immediate Mode Transmission, RF apparatus 10 returns to its sleep state at task 510.

This flow is followed until the Life Timer is exceeded, the battery runs down, or the circuitry 50 is broken or destroyed.

In summary, the present invention provides an improved RF communications apparatus and manufacturing method therefor. An RF communications apparatus and method are provided that are compatible with a small RF communications apparatus. And, an RF communications apparatus and method are provided that are compatible with low power operation. Moreover, an RF communications apparatus and method are provided that are compatible with the use of a non-replaceable battery. Likewise, an RF communications apparatus and method are provided that are inexpensive.

Preferred embodiments of the invention are described above. While these descriptions directly describe the above embodiments, it is understood that those skilled in the art may conceive modifications and/or variations to the specific embodiments shown and described herein. Any such modifications or variations that fall within the purview of this description are intended to be included therein as well.

What is claimed is:

1. A radio-frequency (RF) communications apparatus (10) comprising:
   a planar dielectric substrate (92);
   an RF circuit (54) mounted on said planar dielectric substrate;
   a conductive loop (56) formed as a first conductive trace on said planar dielectric substrate, said conductive loop having a feed point (96) coupled to said RF circuit by a second conductive trace (97) on said planar dielectric substrate; and
   a tuning capacitor (26) formed as first and second juxtaposed conductive pads (26', 26") located on opposing sides of said planar dielectric substrate, said first conductive pad being in contact with a first portion (94) of said conductive loop and said second conductive pad being in contact with a second portion (99) of said conductive loop so that said conductive loop and said tuning capacitor together form a loop antenna (25), said tuning capacitor having a hole (27), said hole having a size selected to tune said loop antenna.

2. An RF communications apparatus as claimed in claim 1 wherein said conductive loop is formed around a periphery of said planar dielectric substrate.

3. An RF communications apparatus as claimed in claim 1 wherein said RF circuit is located in an interior region (25') of said conductive loop.

4. An RF communications apparatus as claimed in claim 1 wherein:
   said second portion of said conductive loop contacts said second pad of said tuning capacitor by way of a conductively plated via (28) through said planar dielectric substrate;
   said tuning capacitor hole passes through said first and second conductive pads; and said tuning capacitor hole is not conductively plated through said planar dielectric substrate.

5. An RF communications apparatus as claimed in claim 1 wherein:
said RF circuit extends a first distance perpendicular to said planar dielectric substrate; and
said RF communications apparatus additionally comprises a conductive mast (58) positioned proximate said conductive loop and extending greater than said first distance perpendicular to said planar dielectric substrate.

6. An RF communications apparatus as claimed in claim 5 wherein:
said conductive mast is positioned within an interior region of said conductive loop;
said conductive mast traverses said planar dielectric substrate; and
said conductive mast extends greater than said first distance on each of opposing sides of said planar dielectric substrate.

7. An RF communications apparatus as claimed in claim 1 wherein said planar dielectric substrate has a dielectric constant greater than 4.

8. An RF communications apparatus as claimed in claim 7 wherein said planar dielectric substrate exhibits a thickness of less than 3.2 mm; and
said RF circuit is configured to process an RF signal exhibiting a frequency between 200 MHz and 800 MHz.

9. An RF communications apparatus as claimed in claim 1 wherein said planar dielectric substrate is a fiberglass epoxy laminate.

10. An RF communications apparatus as claimed in claim 1 wherein:
said RF circuit is a transmitter; and
said RF communications apparatus does not include a receiver.

11. An RF communications apparatus as claimed in claim 1 additionally comprising a non-replaceable battery (88) coupled to said RF circuit.

12. An RF communications apparatus as claimed in claim 1 wherein said RF communications apparatus is configured as an asset tag.

13. An RF communications apparatus as claimed in claim 12 wherein:
said asset tag is configured for attachment to a bottle (68); and
said asset tag includes a conductive pour spout (58) which traverses said planar substrate within an interior region of said conductive loop and serves as a mast which electromagnetically couples to said loop antenna.

14. An RF communications apparatus as claimed in claim 12 wherein:
said asset tag is configured to be attached to a container from which bulk product (66) is dispensed by tilting said container;
said apparatus additionally comprises a control circuit (402) coupled to said RF circuit;
said apparatus additionally comprises a tilt sensor (406) coupled to said control circuit; and
said control circuit is configured to determine a duration for which said container is tilted, said duration describing a quantity of said bulk product dispensed from said container, and to cause data describing said duration to be transmitted through said RF circuit and said loop antenna.

15. A method of manufacturing a radio-frequency (RF) communications apparatus comprising:
forming (140) conductive patterns (22) on a printed wiring board (82) to include a loop antenna (25) having a tuning capacitor (26) with first and second conductive pads (26', 26") juxtaposed on opposing sides of said printed wiring board and a conductive loop (56) having first and second portions (94, 99) respectively contacting said first and second conductive pads;
measuring capacitance (230) of a feature (190) on said printed wiring board, said feature exhibiting a capacitance proportional to a capacitance exhibited by said tuning capacitor;
selecting (234) a hole size in response to said measuring activity; and
forming (236) a hole through said tuning capacitor, said hole exhibiting said hole size.

16. A method as claimed in claim 15 wherein:
said forming activity additionally forms an isolated capacitor (190) having first and second conductive pads (190', 190") juxtaposed on opposing sides of said printed wiring board, said isolated capacitor being electrically isolated from said loop antenna, and said isolated capacitor forming said feature for which said capacitance is measured in said measuring activity.

17. A method as claimed in claim 16 wherein said isolated capacitor is physically located proximate said tuning capacitor.

18. A method as claimed in claim 16 additionally comprising, after said measuring activity, trimming (290) said printed wiring board to remove said isolated capacitor.

19. A method as claimed in claim 15 wherein:
said method additionally comprises, after said patterns-forming activity, installing components (210) which couple to said conductive patterns and which form an RF circuit (54) configured to process an RF signal that exhibits a predetermined frequency;
said printed wiring board exhibits a dielectric constant and a thickness that, prior to said hole-forming activity, causes said loop antenna to have a resonant frequency lower than said predetermined frequency; and
said hole-forming activity causes said resonant frequency to increase to said predetermined frequency.

20. A method as claimed in claim 19 wherein said dielectric constant is greater than 4 and said thickness is less than 3.2 mm.

21. A method as claimed in claim 19 wherein said predetermined frequency is between 200 MHz and 800 MHz.

22. A method as claimed in claim 15 wherein:
said patterns-forming activity concurrently forms conductive patterns for a plurality of printed wiring boards on a common panel, wherein each of said printed wiring boards includes a tuning capacitor; and
said measuring activity measures capacitance of features of fewer than all of said plurality of printed wiring boards in said common panel.

23. A method as claimed in claim 15 wherein:
measured printed wiring boards are the ones of said plurality of printed wiring boards in said common panel for which capacitance features are measured in said measuring activity;
unmeasured printed wiring boards are the ones of said plurality of printed wiring boards in said common panel for which capacitance features are not measured in said measuring activity; and said method additionally comprises estimating capacitances (232) of features of said unmeasured printed wiring boards based on locations of said unmeasured printed wiring boards relative to measured printed wiring boards in said common panel.

24. A method as claimed in claim 15 additionally comprising:
drilling (130) vias (28) through said printed wiring board prior to performing said hole-forming activity; and
plating (135) said vias to form separate conductive electrical connections between opposing sides of said printed wiring board at each of said vias, said plating activity occurring after said drilling activity and prior to said hole-forming activity.

25. A method as claimed in claim 15 additionally comprising:
making an opening (17) through said printed wiring board within an interior region of said conductive loop; and
installing a conductive mast (58) which traverses said printed wiring board through said opening.

26. A method as claimed in claim 25 wherein:
said feature whose capacitance is measured in said measuring activity is located where said opening is formed;
said making activity occurs after said measuring activity; and
said making activity removes said feature from said printed wiring board.

27. A method as claimed in claim 15 additionally comprising trimming (280) said printed wiring board so that said loop antenna is then located at a periphery of said printed wiring board.

28. A radio-frequency (RF) communications apparatus (10) for use as an asset tag configured to be attached to a container (68) from which bulk product (66) is dispensed by tilting said container, said apparatus comprising:
a planar dielectric substrate (92);
an RF circuit (54) mounted on said planar dielectric substrate;
a conductive loop (56) formed as a first conductive trace on said planar dielectric substrate, said conductive loop having a feed point (96) coupled to said RF circuit by a second conductive trace (97) on said planar dielectric substrate;
a tuning capacitor (26) formed as first and second juxtaposed conductive pads (26', 26") located on opposing sides of said planar dielectric substrate, said first conductive pad being in contact with a first portion (94) of said conductive loop and said second conductive pad being in contact with a second portion (99) of said conductive loop so that said conductive loop and said tuning capacitor together form a loop antenna (25), said tuning capacitor having a hole (27), said hole having a size selected to tune said loop antenna;
a tilt sensor (406); and
a control circuit (402) coupled to said RF circuit and to said tilt sensor, said control circuit being configured to determine a duration for which said container is tilted, said duration describing a quantity of said bulk product dispensed from said container, and to cause data describing said duration to be transmitted through said RF circuit and said loop antenna.

29. An RF communications apparatus as claimed in claim 28 wherein:
said conductive loop is formed around a periphery of said planar dielectric substrate; and
said RF circuit is located in an interior region of said conductive loop.

30. An RF communications apparatus as claimed in claim 28 additionally comprising a non-replaceable battery (88) coupled to said RF circuit.

31. An RF communications apparatus as claimed in claim 28 wherein:
said second portion of said conductive loop contacts said second pad of said tuning capacitor by way of a conductively plated via (28) through said planar dielectric substrate;
said tuning capacitor hole passes through said first and second conductive pads; and
said tuning capacitor hole is not conductively plated through said planar dielectric substrate.

32. An RF communications apparatus as claimed in claim 28 additionally comprising a conductive pour spout (58) which traverses said planar substrate within an interior region of said conductive loop and serves as a mast which electromagnetically couples to said loop antenna.

* * * * *